United States Patent
Waggoner et al.

(10) Patent No.: US 12,076,697 B2
(45) Date of Patent: Sep. 3, 2024

(54) PORTABLE CARBONATING DISPENSERS

(71) Applicant: Cirkul, Inc., Tampa, FL (US)

(72) Inventors: Garrett S. Waggoner, Sarasota, FL (US); Andrew Gay, Mill Creek, WA (US); Thomas A. Urbanik, Watertown, MA (US); Corey Jerolmon, Boston, MA (US); Cole Houston, Central Falls, RI (US)

(73) Assignee: Cirkul, Inc., Tampa, FL (US)

( * ) Notice: Subject to any disclaimer, the term of this patent is extended or adjusted under 35 U.S.C. 154(b) by 39 days.

(21) Appl. No.: 17/377,259

(22) Filed: Jul. 15, 2021

(65) Prior Publication Data
US 2022/0016581 A1 Jan. 20, 2022

Related U.S. Application Data

(60) Provisional application No. 63/052,348, filed on Jul. 15, 2020.

(51) Int. Cl.
*B01F 23/2361* (2022.01)
*A23L 2/54* (2006.01)
(Continued)

(52) U.S. Cl.
CPC .......... *B01F 23/23611* (2022.01); *A23L 2/54* (2013.01); *B01F 33/50111* (2022.01);
(Continued)

(58) Field of Classification Search
CPC .......... B01F 33/50111; B01F 23/23611; B01F 23/237621; B01F 23/23762; A23V 2002/00; A23L 2/54
(Continued)

(56) References Cited

U.S. PATENT DOCUMENTS

| D95,559 | S | 5/1935 | Vogel |
| D97,347 | S | 10/1935 | Gambell |

(Continued)

FOREIGN PATENT DOCUMENTS

| CN | 1942392 A | 4/2007 |
| CN | 100575206 C | 12/2009 |

(Continued)

OTHER PUBLICATIONS

"How To Clean a Draft Beer Tap Keg Coupler"(Leaders Beverage) [online] https://www.youtube.com/watch?v=LmtdkjdEq1E>0:00-6:03.

(Continued)

*Primary Examiner* — Eric S Stapleton
(74) *Attorney, Agent, or Firm* — Wolf, Greenfield & Sacks, P.C.

(57) ABSTRACT

A portable carbonating dispenser utilizes an onboard supply of carbonation gas and a carbonation control module for permitting a user to carbonate base liquid stored in an onboard base liquid container. The carbonation control module may include a user actuated button for selectively activating the carbonation. The base liquid container may include an extended portion for increasing the exposure of base liquid to carbonation gas. A vertical viewing window enables a user to view carbonation and the level of base liquid in the container. An isolation component may be useful to isolate an additive cartridge from carbonation pressure during carbonation in applications where the dispenser utilizes additive cartridges. Safety venting and locking features may be provided on the mode selector to prevent a user from accidentally pressurizing the cartridge space. A refill station may be provided to refill the portable carbonating dispenser.

28 Claims, 14 Drawing Sheets

(51) Int. Cl.
  *B01F 23/237* (2022.01)
  *B01F 33/501* (2022.01)
(52) U.S. Cl.
  CPC ..... *A23V 2002/00* (2013.01); *B01F 23/23762* (2022.01); *B01F 23/237621* (2022.01)
(58) Field of Classification Search
  USPC ........................................................ 99/323.2
  See application file for complete search history.

(56) References Cited

U.S. PATENT DOCUMENTS

| | | | |
|---|---|---|---|
| 2,071,399 A | 2/1937 | Gambell | |
| 2,102,105 A * | 12/1937 | Zahm | G01N 7/14 |
| | | | 285/309 |
| 2,462,019 A * | 2/1949 | Bowman | B67D 1/0036 |
| | | | 200/84 R |
| D157,486 S | 2/1950 | Glowacki | |
| 2,682,355 A | 6/1954 | Robbins | |
| 2,876,113 A | 3/1959 | Barton | |
| 2,986,306 A * | 5/1961 | Cocanour | B67D 1/005 |
| | | | 222/129.1 |
| D192,814 S | 5/1962 | Sinaiko | |
| 3,319,637 A | 5/1967 | Gore et al. | |
| 3,506,460 A * | 4/1970 | Bayne | G05D 11/132 |
| | | | 99/275 |
| 3,508,682 A * | 4/1970 | Sherman | A47L 15/4418 |
| | | | 401/47 |
| 3,533,807 A | 10/1970 | Wakefield | |
| 3,548,657 A | 12/1970 | Panerai et al. | |
| D225,364 S | 12/1972 | Antoni | |
| 3,727,803 A | 4/1973 | Cobb | |
| D242,132 S | 11/1976 | Hasegawa et al. | |
| 4,051,726 A | 10/1977 | Hastbacka | |
| 4,087,024 A | 5/1978 | Martin et al. | |
| 4,125,187 A | 11/1978 | Vecchiotti | |
| 4,133,457 A | 1/1979 | Klassen | |
| 4,252,253 A | 2/1981 | Shannon et al. | |
| 4,278,186 A | 7/1981 | Williamson et al. | |
| 4,304,736 A * | 12/1981 | McMillin | B67D 1/103 |
| | | | 417/396 |
| 4,306,667 A * | 12/1981 | Sedam | B67D 1/0021 |
| | | | 222/83.5 |
| 4,310,025 A * | 1/1982 | Tracy | B01F 23/23413 |
| | | | 137/625.48 |
| 4,316,409 A | 2/1982 | Adams et al. | |
| 4,354,806 A * | 10/1982 | McMillin | B67D 1/0406 |
| | | | 417/393 |
| 4,359,432 A * | 11/1982 | Sedam | B67D 1/1279 |
| | | | 261/DIG. 7 |
| 4,376,496 A * | 3/1983 | Sedam | B67D 1/1279 |
| | | | 222/83.5 |
| 4,450,722 A | 5/1984 | Keyes et al. | |
| 4,481,986 A | 11/1984 | Meyers | |
| D279,621 S | 7/1985 | Richer | |
| 4,610,282 A | 9/1986 | Brooks et al. | |
| 4,655,124 A * | 4/1987 | Child | B01F 23/2362 |
| | | | 261/DIG. 7 |
| 4,688,701 A | 8/1987 | Sedam | |
| 4,728,006 A | 3/1988 | Drobish et al. | |
| D295,954 S | 5/1988 | Kirchhoff | |
| D296,302 S | 6/1988 | Weber | |
| 4,800,492 A | 1/1989 | Johnson et al. | |
| 4,827,426 A | 5/1989 | Patton et al. | |
| 4,840,291 A | 6/1989 | Merlin | |
| 4,850,269 A * | 7/1989 | Hancock | B01F 35/2112 |
| | | | 261/DIG. 7 |
| 4,898,306 A | 2/1990 | Pardes | |
| 4,909,417 A * | 3/1990 | Ripley | B67D 1/04 |
| | | | 222/145.5 |
| 4,915,261 A * | 4/1990 | Strenger | A47J 31/407 |
| | | | 222/107 |
| 4,938,387 A | 7/1990 | Kervefors et al. | |
| 4,964,541 A | 10/1990 | Gueret | |
| 5,080,260 A | 1/1992 | During | |
| 5,092,750 A * | 3/1992 | Leroy | F04B 35/04 |
| | | | 417/313 |
| 5,119,279 A | 6/1992 | Makowsky | |
| 5,139,169 A | 8/1992 | Boyer | |
| 5,165,569 A * | 11/1992 | Furuhashi | B65D 7/045 |
| | | | 220/4.12 |
| 5,174,458 A | 12/1992 | Segati | |
| 5,182,084 A | 1/1993 | Plester | |
| 5,192,513 A * | 3/1993 | Stumphauzer | B67D 1/0071 |
| | | | 261/DIG. 7 |
| D336,216 S | 6/1993 | Rohrbeck | |
| 5,282,131 A | 1/1994 | Rudd et al. | |
| 5,325,765 A | 7/1994 | Sylvan et al. | |
| 5,344,034 A | 9/1994 | Eagan | |
| D352,204 S | 11/1994 | Hayes et al. | |
| 5,377,877 A | 1/1995 | Brown et al. | |
| 5,379,916 A | 1/1995 | Martindale et al. | |
| 5,398,853 A | 3/1995 | Latham | |
| 5,474,211 A | 12/1995 | Hellenberg | |
| 5,531,254 A | 7/1996 | Rosenbach | |
| D372,867 S | 8/1996 | Lambelet | |
| 5,588,557 A | 12/1996 | Topar | |
| 5,592,867 A * | 1/1997 | Walsh | B67D 1/0057 |
| | | | 261/DIG. 7 |
| D382,808 S | 8/1997 | Fenton et al. | |
| D383,383 S | 9/1997 | Prestia et al. | |
| 5,664,702 A * | 9/1997 | Beauchamp | B67D 1/0425 |
| | | | 137/212 |
| D387,992 S | 12/1997 | Kotoucek | |
| 5,725,125 A | 3/1998 | Bessette et al. | |
| 5,747,824 A | 5/1998 | Jung et al. | |
| D396,603 S | 8/1998 | Gasser | |
| 5,810,062 A | 9/1998 | Bonora et al. | |
| D399,098 S | 10/1998 | Yang | |
| D400,050 S | 10/1998 | Littmann | |
| D404,253 S | 1/1999 | Littmann | |
| 5,890,624 A * | 4/1999 | Klima | B05B 11/0081 |
| | | | 222/129 |
| 5,938,080 A | 8/1999 | Haaser et al. | |
| 5,960,701 A | 10/1999 | Reese et al. | |
| 5,967,367 A | 10/1999 | Orsborn et al. | |
| 6,077,579 A | 6/2000 | De Laforcade | |
| 6,140,932 A | 10/2000 | Frank et al. | |
| 6,142,063 A | 11/2000 | Beaulieu et al. | |
| 6,170,712 B1 | 1/2001 | Kasboske | |
| 6,230,884 B1 | 5/2001 | Coory | |
| 6,230,923 B1 | 5/2001 | Hung | |
| 6,372,270 B1 | 4/2002 | Denny | |
| 6,422,422 B1 | 7/2002 | Forbes | |
| 6,424,884 B1 | 7/2002 | Brooke et al. | |
| 6,446,049 B1 | 9/2002 | Janning et al. | |
| 6,504,481 B2 | 1/2003 | Teller | |
| 6,517,878 B2 | 2/2003 | Heczko | |
| 6,520,070 B1 | 2/2003 | Heczko | |
| 6,529,446 B1 | 3/2003 | de la Huerga et al. | |
| 6,574,575 B2 | 6/2003 | Deng et al. | |
| D477,791 S | 7/2003 | Wells | |
| D478,073 S | 8/2003 | Topinka | |
| 6,615,881 B2 | 9/2003 | Bartholomew et al. | |
| 6,644,471 B1 | 11/2003 | Anderson | |
| 6,703,935 B1 | 3/2004 | Chung et al. | |
| 6,722,530 B1 | 4/2004 | King et al. | |
| 6,761,318 B2 | 7/2004 | Dudek et al. | |
| D499,603 S | 12/2004 | Nikkhah | |
| D500,936 S | 1/2005 | Nikkhah | |
| 6,889,872 B2 | 5/2005 | Herman et al. | |
| 6,921,911 B2 | 7/2005 | Siepmann | |
| 6,925,871 B2 | 8/2005 | Frank | |
| 6,935,493 B2 | 8/2005 | Cho | |
| D514,385 S | 2/2006 | Smith et al. | |
| 7,004,213 B2 | 2/2006 | Hansen | |
| D517,852 S | 3/2006 | Jalet | |
| 7,032,818 B2 | 4/2006 | Thomas et al. | |
| D522,860 S | 6/2006 | LaFortune | |
| D523,332 S | 6/2006 | McEldowney et al. | |
| D525,135 S | 7/2006 | Bakic | |
| 7,104,184 B2 | 9/2006 | Biderman et al. | |
| 7,107,838 B2 | 9/2006 | Chai et al. | |

(56) References Cited

U.S. PATENT DOCUMENTS

| | | | |
|---|---|---|---|
| D529,340 S | 10/2006 | Laib et al. | |
| D530,968 S | 10/2006 | Bodum | |
| D533,018 S | 12/2006 | Berg | |
| 7,172,095 B2 | 2/2007 | Marshall | |
| 7,196,624 B2 | 3/2007 | Teller | |
| D541,106 S | 4/2007 | Spiegel | |
| D541,596 S | 5/2007 | Hicks | |
| 7,228,879 B2 | 6/2007 | Miller et al. | |
| 7,319,523 B2 | 1/2008 | Chiarello et al. | |
| D565,350 S | 4/2008 | Gauger | |
| 7,387,239 B2 | 6/2008 | Thomas et al. | |
| D572,588 S | 7/2008 | Osborn et al. | |
| D573,464 S | 7/2008 | Kogure et al. | |
| 7,439,859 B2 | 10/2008 | Humphrey | |
| D582,767 S | 12/2008 | Batton et al. | |
| 7,464,811 B2 | 12/2008 | Patterson et al. | |
| 7,501,933 B2 | 3/2009 | Rousso et al. | |
| D591,599 S | 5/2009 | Okin et al. | |
| D593,411 S | 6/2009 | Bizzell | |
| D596,487 S | 7/2009 | Batton et al. | |
| 7,612,675 B2 | 11/2009 | Miller et al. | |
| 7,614,496 B2 | 11/2009 | Dvorak et al. | |
| D608,637 S | 1/2010 | Getsy | |
| 7,661,561 B2 * | 2/2010 | Ophardt | A47K 5/14 222/137 |
| D611,298 S | 3/2010 | Freeman et al. | |
| D613,183 S | 4/2010 | Overgaard et al. | |
| 7,710,567 B1 | 5/2010 | Mentzer et al. | |
| 7,715,277 B2 | 5/2010 | de la Huerga et al. | |
| D618,963 S | 7/2010 | Freeman et al. | |
| 7,762,181 B2 | 7/2010 | Boland et al. | |
| D621,283 S | 8/2010 | Overgaard et al. | |
| 7,798,373 B1 | 9/2010 | Wroblewski et al. | |
| 7,806,294 B2 * | 10/2010 | Gatipon | B67D 1/0036 222/1 |
| 7,825,804 B2 | 11/2010 | Malik | |
| D634,157 S | 3/2011 | Hoff et al. | |
| D635,823 S | 4/2011 | Mauffette | |
| D635,864 S | 4/2011 | Lee | |
| D639,607 S | 6/2011 | Bracq | |
| RE42,937 E | 11/2011 | Lasher et al. | |
| 8,083,055 B2 | 12/2011 | Simonian et al. | |
| D651,474 S | 1/2012 | Gut | |
| 8,091,735 B2 | 1/2012 | Girard et al. | |
| 8,141,700 B2 | 3/2012 | Simonian et al. | |
| D658,982 S | 5/2012 | Pauser et al. | |
| D659,472 S | 5/2012 | D'Amato | |
| 8,196,776 B2 | 6/2012 | Doglioni Majer | |
| 8,210,396 B2 | 7/2012 | Girard et al. | |
| 8,240,508 B2 | 8/2012 | Wegelin et al. | |
| 8,302,795 B2 | 11/2012 | Van Den Broek et al. | |
| 8,306,655 B2 * | 11/2012 | Newman | B67D 1/0882 700/239 |
| 8,361,527 B2 | 1/2013 | Winkler et al. | |
| 8,378,830 B2 | 2/2013 | Moran | |
| 8,397,519 B2 | 3/2013 | Loibl et al. | |
| 8,417,377 B2 | 4/2013 | Rothschild | |
| 8,442,674 B2 | 5/2013 | Tilton et al. | |
| 8,463,447 B2 | 6/2013 | Newman et al. | |
| 8,464,633 B2 | 6/2013 | Anson et al. | |
| 8,485,359 B2 | 7/2013 | Anderson | |
| D688,531 S | 8/2013 | Ceder | |
| 8,515,574 B2 | 8/2013 | Studor et al. | |
| 8,519,824 B1 | 8/2013 | Rankin et al. | |
| 8,522,968 B2 | 9/2013 | Middleman et al. | |
| 8,523,837 B2 | 9/2013 | Wiggins et al. | |
| D690,990 S | 10/2013 | Boggs et al. | |
| D690,991 S | 10/2013 | Boggs et al. | |
| 8,556,127 B2 | 10/2013 | Olson et al. | |
| 8,584,691 B2 | 11/2013 | Hammonds | |
| 8,584,840 B2 | 11/2013 | Kim | |
| 8,590,753 B2 | 11/2013 | Marina et al. | |
| D699,106 S | 2/2014 | Glaser et al. | |
| D699,996 S | 2/2014 | De Leo | |
| D700,008 S | 2/2014 | Ehrenhaus | |
| 8,641,016 B2 * | 2/2014 | Tatera | B01F 35/7162 261/DIG. 7 |
| 8,678,183 B2 | 3/2014 | Jones | |
| D702,474 S | 4/2014 | Scherer et al. | |
| 8,684,231 B2 | 4/2014 | Lane et al. | |
| 8,684,240 B2 * | 4/2014 | Sauer | G05D 16/0655 222/394 |
| 8,695,420 B1 | 4/2014 | Korman et al. | |
| 8,701,906 B1 | 4/2014 | Anderson | |
| 8,717,182 B1 | 5/2014 | Brashears et al. | |
| 8,718,819 B2 | 5/2014 | Hyde et al. | |
| 8,751,037 B2 | 6/2014 | Peters et al. | |
| 8,754,769 B2 | 6/2014 | Stein et al. | |
| 8,757,227 B2 | 6/2014 | Girard et al. | |
| D709,387 S | 7/2014 | Marina et al. | |
| 8,794,485 B2 | 8/2014 | Lunn et al. | |
| 8,801,688 B2 | 8/2014 | Wiggins et al. | |
| 8,808,775 B2 | 8/2014 | Novak et al. | |
| 8,833,607 B2 | 9/2014 | Wegelin et al. | |
| 8,851,740 B1 | 10/2014 | Mills et al. | |
| 8,863,649 B1 | 10/2014 | Rao et al. | |
| 8,919,613 B2 | 12/2014 | Mileti et al. | |
| 8,940,163 B2 | 1/2015 | Bassett | |
| 8,945,374 B2 | 2/2015 | Chase | |
| 8,977,389 B2 | 3/2015 | Witchell et al. | |
| 8,979,539 B1 | 3/2015 | Snyder | |
| 8,985,395 B2 | 3/2015 | Tansey | |
| 8,989,673 B2 | 3/2015 | Sandy | |
| 8,991,648 B2 | 3/2015 | Smith et al. | |
| D727,171 S | 4/2015 | Marina et al. | |
| 9,014,846 B2 | 4/2015 | Newman | |
| 9,020,635 B2 | 4/2015 | Hortin | |
| D729,571 S | 5/2015 | Wilson et al. | |
| 9,031,689 B1 | 5/2015 | Fink et al. | |
| 9,035,222 B2 | 5/2015 | Alexander | |
| 9,035,765 B2 | 5/2015 | Engelhard et al. | |
| D731,242 S | 6/2015 | Machovina et al. | |
| D731,243 S | 6/2015 | Machovina et al. | |
| 9,051,162 B2 | 6/2015 | Peters et al. | |
| 9,102,441 B2 | 8/2015 | Orvik | |
| 9,111,324 B2 | 8/2015 | Hyde et al. | |
| 9,126,738 B2 | 9/2015 | Boggs et al. | |
| 9,134,020 B1 | 9/2015 | Wells | |
| 9,138,091 B2 | 9/2015 | Zhao et al. | |
| 9,151,605 B1 | 10/2015 | Sweeney et al. | |
| 9,161,654 B2 | 10/2015 | Belmont | |
| 9,169,112 B2 | 10/2015 | Chase et al. | |
| D742,691 S | 11/2015 | Zhang | |
| 9,174,777 B2 * | 11/2015 | Defemme | A61F 9/0008 |
| D746,046 S | 12/2015 | Lee | |
| 9,230,923 B2 * | 1/2016 | Lamy | G06F 21/87 |
| D748,955 S | 2/2016 | Oliver | |
| 9,254,250 B1 | 2/2016 | Orofino | |
| D751,865 S | 3/2016 | Harris et al. | |
| D752,391 S | 3/2016 | Hatherell | |
| D752,396 S | 3/2016 | Tu et al. | |
| 9,290,309 B1 | 3/2016 | Pabon | |
| D758,868 S | 6/2016 | Bretschneider | |
| 9,357,887 B2 | 6/2016 | Wegelin et al. | |
| D760,537 S | 7/2016 | Hertaus | |
| D768,507 S | 10/2016 | Hotell | |
| 9,499,385 B1 | 11/2016 | Studor et al. | |
| 9,506,798 B2 | 11/2016 | Saltzgiver et al. | |
| 9,511,987 B2 | 12/2016 | Hayakawa et al. | |
| D779,881 S | 2/2017 | Lee et al. | |
| D813,049 S | 3/2018 | Richmond | |
| 9,932,217 B2 | 4/2018 | Perrelli et al. | |
| D826,052 S | 8/2018 | Harris et al. | |
| 10,095,972 B2 | 10/2018 | Bhatia et al. | |
| 10,112,752 B2 | 10/2018 | Tonn et al. | |
| D836,385 S | 12/2018 | Arzunyan | |
| D837,594 S | 1/2019 | Palese | |
| 10,178,925 B2 | 1/2019 | Rithener et al. | |
| 10,231,567 B2 | 3/2019 | Perrelli et al. | |
| 10,314,320 B2 | 6/2019 | Roberts et al. | |
| 10,328,402 B2 | 6/2019 | Kolar et al. | |
| 10,363,530 B2 | 7/2019 | Kolar et al. | |
| D856,083 S | 8/2019 | Lawson-Shanks et al. | |
| 10,413,131 B2 | 9/2019 | Kolar et al. | |

(56) References Cited

U.S. PATENT DOCUMENTS

| | | |
|---|---|---|
| 10,489,868 B2 | 11/2019 | Long et al. |
| 10,512,358 B1 | 12/2019 | Perrelli et al. |
| 10,513,424 B2 | 12/2019 | Tansey et al. |
| D878,864 S | 3/2020 | Lawson-Shanks et al. |
| 10,621,850 B2 | 4/2020 | Laidlaw et al. |
| D887,769 S | 6/2020 | Lyons et al. |
| 10,674,857 B2 | 6/2020 | Lyons et al. |
| 10,758,077 B1 | 9/2020 | Wilkie et al. |
| 10,765,252 B2 | 9/2020 | Perrelli et al. |
| 10,863,852 B1 | 12/2020 | Lyons et al. |
| 10,881,239 B2 | 1/2021 | Perrelli et al. |
| 10,888,191 B1 | 1/2021 | Lyons et al. |
| 10,889,424 B1 | 1/2021 | Lyons et al. |
| 10,889,425 B1 | 1/2021 | Lyons et al. |
| 10,889,481 B2 | 1/2021 | Perrelli et al. |
| 10,889,482 B1 | 1/2021 | Maclean et al. |
| 10,913,647 B2 | 2/2021 | Lyons et al. |
| 10,934,150 B1 | 3/2021 | MacLean et al. |
| 10,941,030 B1 | 3/2021 | Lyons et al. |
| 10,947,102 B1 | 3/2021 | Lyons et al. |
| 10,981,769 B2 | 4/2021 | Lyons et al. |
| 10,981,772 B1 | 4/2021 | Lyons et al. |
| 10,994,979 B1 | 5/2021 | Lyons et al. |
| 11,001,487 B2 | 5/2021 | Lyons et al. |
| 11,059,711 B1 | 7/2021 | Lyons et al. |
| 11,337,533 B1 | 5/2022 | Perrelli et al. |
| 2001/0025859 A1* | 10/2001 | Dumont .............. B05B 11/1081 222/145.6 |
| 2001/0032036 A1 | 10/2001 | Sudolcan et al. |
| 2001/0054083 A1 | 12/2001 | Defosse |
| 2002/0070861 A1 | 6/2002 | Teller |
| 2002/0090426 A1 | 7/2002 | Denny |
| 2002/0129663 A1 | 9/2002 | Hoyt et al. |
| 2003/0090892 A1 | 5/2003 | Su |
| 2003/0121937 A1 | 7/2003 | Black et al. |
| 2003/0191558 A1 | 10/2003 | Arellano |
| 2004/0112070 A1 | 6/2004 | Schanin |
| 2005/0258082 A1* | 11/2005 | Lund ...................... C02F 1/003 210/94 |
| 2005/0284302 A1 | 12/2005 | Levin |
| 2006/0011664 A1* | 1/2006 | Hammond .......... B67D 1/0412 222/400.7 |
| 2006/0061985 A1 | 3/2006 | Elkins |
| 2006/0081653 A1 | 4/2006 | Boland et al. |
| 2006/0115570 A1 | 6/2006 | Guerrero et al. |
| 2006/0191824 A1 | 8/2006 | Arett et al. |
| 2006/0219858 A1 | 10/2006 | Iacovino |
| 2007/0024465 A1 | 2/2007 | Howell |
| 2007/0095859 A1 | 5/2007 | Maser |
| 2007/0114244 A1 | 5/2007 | Gatipon et al. |
| 2007/0137643 A1 | 6/2007 | Bonney et al. |
| 2007/0157576 A1 | 7/2007 | Till |
| 2007/0203587 A1 | 8/2007 | Erlandsson et al. |
| 2007/0214055 A1 | 9/2007 | Temko |
| 2008/0023488 A1 | 1/2008 | Guerrero et al. |
| 2008/0178749 A1 | 7/2008 | Stutman |
| 2008/0190958 A1 | 8/2008 | Wyner et al. |
| 2009/0069930 A1 | 3/2009 | Peters et al. |
| 2009/0069934 A1 | 3/2009 | Newman et al. |
| 2009/0069947 A1 | 3/2009 | Newman |
| 2009/0069949 A1 | 3/2009 | Carpenter et al. |
| 2009/0120815 A1 | 5/2009 | Mitchell |
| 2009/0205506 A1 | 8/2009 | Lin |
| 2009/0206084 A1 | 8/2009 | Woolf et al. |
| 2009/0228367 A1 | 9/2009 | Hughes et al. |
| 2009/0272274 A1 | 11/2009 | De Graaff et al. |
| 2010/0024660 A1 | 2/2010 | Wallace |
| 2010/0040743 A1 | 2/2010 | Drost |
| 2010/0055252 A1 | 3/2010 | Marina et al. |
| 2010/0133222 A1 | 6/2010 | Mathieu |
| 2010/0145522 A1 | 6/2010 | Claesson et al. |
| 2010/0163567 A1 | 7/2010 | Chiang et al. |
| 2010/0183776 A1 | 7/2010 | Gruenwald et al. |
| 2010/0219151 A1 | 9/2010 | Risheq |
| 2010/0242497 A1 | 9/2010 | Bertone |
| 2010/0316434 A1 | 12/2010 | Maxwell |
| 2010/0318221 A1 | 12/2010 | Wiemer |
| 2011/0006071 A1 | 1/2011 | Koumans |
| 2011/0024537 A1 | 2/2011 | Gonzalez |
| 2011/0036803 A1 | 2/2011 | Mejia et al. |
| 2011/0049161 A1 | 3/2011 | Savinskyi |
| 2011/0049195 A1 | 3/2011 | Russell et al. |
| 2011/0050431 A1 | 3/2011 | Hood et al. |
| 2011/0052764 A1 | 3/2011 | Bulgin |
| 2011/0060457 A1 | 3/2011 | De Vrught et al. |
| 2011/0166910 A1 | 7/2011 | Marina et al. |
| 2011/0180563 A1 | 7/2011 | Fitchett et al. |
| 2011/0220106 A1 | 9/2011 | Ganem et al. |
| 2011/0290677 A1* | 12/2011 | Simonian ........... B65D 51/2807 206/219 |
| 2011/0290678 A1* | 12/2011 | Simonian ............. B65D 47/243 220/521 |
| 2011/0301768 A1 | 12/2011 | Hammonds et al. |
| 2012/0017766 A1 | 1/2012 | Anson et al. |
| 2012/0035761 A1 | 2/2012 | Tilton et al. |
| 2012/0088022 A1 | 4/2012 | Carbone et al. |
| 2012/0094261 A1 | 4/2012 | Hayn et al. |
| 2012/0097567 A1 | 4/2012 | Zhao et al. |
| 2012/0100275 A1 | 4/2012 | Bishop et al. |
| 2012/0104023 A1 | 5/2012 | Anselmino et al. |
| 2012/0156337 A1 | 6/2012 | Studor et al. |
| 2012/0173164 A1 | 7/2012 | Steuerwald et al. |
| 2012/0230149 A1 | 9/2012 | Martin |
| 2012/0234183 A1 | 9/2012 | Edwards et al. |
| 2012/0267320 A1 | 10/2012 | Baccigalopi |
| 2012/0285985 A1 | 11/2012 | Jones |
| 2012/0298532 A1 | 11/2012 | Woolf et al. |
| 2013/0001244 A1 | 1/2013 | Wegelin et al. |
| 2013/0037506 A1 | 2/2013 | Wahlstrom |
| 2013/0043304 A1 | 2/2013 | Agon et al. |
| 2013/0062366 A1* | 3/2013 | Tansey ................ B67D 1/0809 222/101 |
| 2013/0068772 A1 | 3/2013 | Durdon et al. |
| 2013/0082022 A1 | 4/2013 | Cronin et al. |
| 2013/0085599 A1 | 4/2013 | Nicol et al. |
| 2013/0089645 A1* | 4/2013 | Leung ................ B01F 23/2361 261/38 |
| 2013/0092567 A1 | 4/2013 | Lok |
| 2013/0127748 A1 | 5/2013 | Vertegaal et al. |
| 2013/0139703 A1 | 6/2013 | Hogarth |
| 2013/0139893 A1* | 6/2013 | Anson ..................... B65D 51/28 224/148.1 |
| 2013/0156903 A1 | 6/2013 | Bombeck et al. |
| 2013/0156904 A1 | 6/2013 | Nosler et al. |
| 2013/0186779 A1 | 7/2013 | Kambouris |
| 2013/0226337 A1 | 8/2013 | Leech et al. |
| 2013/0240079 A1 | 9/2013 | Petrini |
| 2013/0247770 A1 | 9/2013 | Wilder et al. |
| 2013/0319915 A1* | 12/2013 | Gellibolian ............. C02F 1/002 210/87 |
| 2013/0325174 A1 | 12/2013 | Crisp, III |
| 2013/0334250 A1* | 12/2013 | Albaum ............... B65D 81/3272 222/129 |
| 2013/0340453 A1 | 12/2013 | Chan |
| 2013/0341395 A1 | 12/2013 | Chan |
| 2014/0004241 A1 | 1/2014 | Hatherell |
| 2014/0034183 A1 | 2/2014 | Gross et al. |
| 2014/0044837 A1 | 2/2014 | Weisman et al. |
| 2014/0079856 A1 | 3/2014 | Hatherell |
| 2014/0110476 A1 | 4/2014 | Sheehan et al. |
| 2014/0114469 A1 | 4/2014 | Givens et al. |
| 2014/0150670 A1 | 6/2014 | Green et al. |
| 2014/0154382 A1 | 6/2014 | Green et al. |
| 2014/0166694 A1 | 6/2014 | Otto |
| 2014/0170279 A1 | 6/2014 | Kolls et al. |
| 2014/0230659 A1* | 8/2014 | Waggoner ............. A47J 31/005 99/323 |
| 2014/0269154 A1 | 9/2014 | Kolar et al. |
| 2014/0272019 A1 | 9/2014 | Schuh et al. |
| 2014/0273925 A1 | 9/2014 | Burgett et al. |
| 2014/0277707 A1 | 9/2014 | Akdogan et al. |
| 2014/0303790 A1 | 10/2014 | Huang et al. |
| 2014/0305952 A1 | 10/2014 | Harris et al. |

(56) References Cited

U.S. PATENT DOCUMENTS

| | | |
|---|---|---|
| 2014/0312247 A1 | 10/2014 | McKee et al. |
| 2014/0324585 A1 | 10/2014 | Mederos |
| 2014/0335490 A1 | 11/2014 | Baarman et al. |
| 2014/0346063 A1 | 11/2014 | Woolf et al. |
| 2014/0352843 A1 | 12/2014 | Solera et al. |
| 2014/0354438 A1 | 12/2014 | Hazen et al. |
| 2014/0372045 A1 | 12/2014 | Keski-Pukkila et al. |
| 2014/0374438 A1 | 12/2014 | Carpenter et al. |
| 2015/0014369 A1 | 1/2015 | Hatton et al. |
| 2015/0024349 A1 | 1/2015 | Bischoff et al. |
| 2015/0053271 A1* | 2/2015 | Ko .................. F25D 23/126 |
| | | 99/323.2 |
| 2015/0060481 A1 | 3/2015 | Murray et al. |
| 2015/0060482 A1 | 3/2015 | Murray et al. |
| 2015/0065587 A1* | 3/2015 | Ochoa .................. A23L 2/52 |
| | | 514/789 |
| 2015/0088304 A1 | 3/2015 | Ameye et al. |
| 2015/0115158 A1 | 4/2015 | Fu et al. |
| 2015/0122688 A1 | 5/2015 | Dias et al. |
| 2015/0128811 A1* | 5/2015 | Durairajasivam ........ A23L 2/52 |
| | | 99/283 |
| 2015/0173488 A1 | 6/2015 | Witchell et al. |
| 2015/0175400 A1 | 6/2015 | Newman |
| 2015/0182797 A1 | 7/2015 | Wernow et al. |
| 2015/0183627 A1* | 7/2015 | Tansey, Jr. ........... B67D 1/0078 |
| | | 222/190 |
| 2015/0223623 A1 | 8/2015 | Davis |
| 2015/0271582 A1 | 9/2015 | Cheng |
| 2015/0272394 A1 | 10/2015 | Lin et al. |
| 2015/0284163 A1 | 10/2015 | Manwani |
| 2016/0055599 A1 | 2/2016 | Illy et al. |
| 2016/0123786 A1 | 5/2016 | Hanna et al. |
| 2016/0143474 A1 | 5/2016 | Wessels et al. |
| 2016/0143583 A1* | 5/2016 | Jeukendrup ................ A45F 3/16 |
| | | 702/45 |
| 2016/0150914 A1* | 6/2016 | Waggoner .............. B65D 47/06 |
| | | 366/130 |
| 2016/0159632 A1* | 6/2016 | Wheatley ............. B67D 1/0882 |
| | | 222/129 |
| 2016/0174470 A1 | 6/2016 | Shaffer et al. |
| 2016/0175785 A1 | 6/2016 | Li et al. |
| 2016/0176696 A1 | 6/2016 | Hecht et al. |
| 2016/0220973 A1 | 8/2016 | Kolar et al. |
| 2016/0251234 A1 | 9/2016 | Hayslett et al. |
| 2016/0257554 A1 | 9/2016 | Manwani et al. |
| 2016/0286993 A1 | 10/2016 | Pau |
| 2016/0317985 A1 | 11/2016 | Mutschler et al. |
| 2016/0325980 A1 | 11/2016 | Sawhney et al. |
| 2016/0364814 A1 | 12/2016 | Yekutiely et al. |
| 2016/0367072 A1 | 12/2016 | Boone et al. |
| 2016/0376140 A1 | 12/2016 | Tansey, Jr. |
| 2017/0000295 A1 | 1/2017 | Hanna et al. |
| 2017/0066638 A1 | 3/2017 | Gatipon |
| 2017/0087524 A1 | 3/2017 | Deshpande |
| 2017/0088410 A1 | 3/2017 | Wing et al. |
| 2017/0101298 A1 | 4/2017 | Renzi |
| 2017/0121165 A1 | 5/2017 | Gabrieli |
| 2017/0156540 A1 | 6/2017 | Wheatley et al. |
| 2017/0186110 A1 | 6/2017 | Carpenter et al. |
| 2017/0303744 A1 | 10/2017 | Sutton et al. |
| 2017/0332829 A1 | 11/2017 | Kim et al. |
| 2017/0335256 A1 | 11/2017 | Park et al. |
| 2017/0347690 A1 | 12/2017 | Benedetti |
| 2017/0353820 A1 | 12/2017 | Chiang |
| 2017/0361984 A1 | 12/2017 | Fouad |
| 2017/0367522 A1 | 12/2017 | Ackel et al. |
| 2018/0020875 A1 | 1/2018 | Kolar et al. |
| 2018/0029859 A1 | 2/2018 | Hevia et al. |
| 2018/0042258 A1 | 2/2018 | Roberts et al. |
| 2018/0044157 A1 | 2/2018 | Cohen et al. |
| 2018/0049582 A1 | 2/2018 | Rehfuss |
| 2018/0059790 A1 | 3/2018 | Kolar et al. |
| 2018/0072460 A1 | 3/2018 | Wolfson et al. |
| 2018/0072553 A1 | 3/2018 | Lyons et al. |
| 2018/0099850 A1 | 4/2018 | Lyons et al. |
| 2018/0129360 A1 | 5/2018 | Suh |
| 2018/0129379 A1 | 5/2018 | Suh |
| 2018/0129380 A1 | 5/2018 | Suh |
| 2018/0132507 A1 | 5/2018 | Siegel et al. |
| 2018/0168385 A1 | 6/2018 | Boone et al. |
| 2018/0177325 A1 | 6/2018 | Lyons et al. |
| 2018/0178957 A1* | 6/2018 | Zalewski ............... B65D 41/04 |
| 2018/0186528 A1 | 7/2018 | Tonn et al. |
| 2018/0208447 A1 | 7/2018 | Perrelli et al. |
| 2018/0344070 A1 | 12/2018 | Perrelli et al. |
| 2019/0001288 A1 | 1/2019 | Ciepiel et al. |
| 2019/0015803 A1 | 1/2019 | Goodson |
| 2019/0060849 A1 | 2/2019 | Waggoner et al. |
| 2019/0185311 A1 | 6/2019 | Karol et al. |
| 2019/0208948 A1 | 7/2019 | Perrelli et al. |
| 2019/0254465 A1 | 8/2019 | Di Maria et al. |
| 2019/0300355 A1 | 10/2019 | Pappas |
| 2020/0010257 A1 | 1/2020 | Lubbe et al. |
| 2020/0031654 A1 | 1/2020 | Wing et al. |
| 2020/0031656 A1 | 1/2020 | Rudick et al. |
| 2020/0079637 A1 | 3/2020 | Kaplita et al. |
| 2020/0095108 A1 | 3/2020 | Cook |
| 2020/0113374 A1 | 4/2020 | Perrelli et al. |
| 2020/0115122 A1 | 4/2020 | Golden et al. |
| 2020/0122992 A1 | 4/2020 | Lyons et al. |
| 2020/0156020 A1 | 5/2020 | Waggoner et al. |
| 2020/0156922 A1 | 5/2020 | Lee et al. |
| 2020/0165550 A1 | 5/2020 | Lee et al. |
| 2020/0181559 A1 | 6/2020 | Kim et al. |
| 2020/0205615 A1 | 7/2020 | Pamplin |
| 2020/0242910 A1 | 7/2020 | Laidlaw et al. |
| 2020/0247661 A1 | 8/2020 | Rao et al. |
| 2021/0007533 A1 | 1/2021 | Lyons et al. |
| 2021/0316978 A1 | 10/2021 | Lyons et al. |
| 2021/0340000 A1 | 11/2021 | Lyons et al. |
| 2021/0347627 A1 | 11/2021 | Maclean et al. |
| 2022/0039586 A1 | 2/2022 | Lyons et al. |
| 2022/0259034 A1 | 8/2022 | Mullenaux et al. |
| 2023/0309739 A1 | 10/2023 | Perrelli et al. |

FOREIGN PATENT DOCUMENTS

| | | |
|---|---|---|
| DE | 3428178 A1 | 2/1986 |
| EP | 0 258 057 A2 | 3/1988 |
| EP | 1 793 326 A2 | 6/2007 |
| EP | 1 671 568 B1 | 10/2008 |
| GB | 860987 A | 2/1961 |
| KR | 20110007327 A | 1/2011 |
| WO | WO 2008/111072 A2 | 9/2008 |
| WO | WO 2016/081387 A1 | 5/2016 |
| WO | WO 2016/090235 A1 | 6/2016 |
| WO | WO 2016/201305 A1 | 12/2016 |
| WO | WO 2017/085073 A1 | 5/2017 |
| WO | WO 2020/077137 A1 | 4/2020 |

OTHER PUBLICATIONS

"Inspection Keg 1/2 Bbl." (GW KENT) [online] <URL: https://web.archive.org/web/20170626014816/http://www.gwkent.com/inspection-keg.html. p. 1-2.

PCT/US21/41887 Invititation to Pay Additional Fees mailed on Oct. 6, 2021.

PCT_US21_41887 International Search Report and Written Opinion dated Dec. 23, 2021.

U.S. Appl. No. 14/181,354, filed Feb. 14, 2014, Waggoner et al.
U.S. Appl. No. 14/948,225, filed Nov. 20, 2015, Waggoner et al.
U.S. Appl. No. 15/358,087, filed Nov. 21, 2016, Waggoner et al.
U.S. Appl. No. 15/451,384, filed Mar. 6, 2017, Waggoner et al.
U.S. Appl. No. 15/791,348, filed Oct. 23, 2017, Waggoner et al.
U.S. Appl. No. 15/903,014, filed Feb. 22, 2018, Waggoner et al.
U.S. Appl. No. 16/235,913, filed Dec. 28, 2018, Waggoner et al.
U.S. Appl. No. 16/436,861, filed Jun. 10, 2019, Waggoner et al.
U.S. Appl. No. 16/679,060, filed Nov. 8, 2019, Waggoner et al.
U.S. Appl. No. 17/067,546, filed Oct. 9, 2020, Waggoner et al.
U.S. Appl. No. 17/106,053, filed Nov. 27, 2020, Waggoner et al.

(56) References Cited

OTHER PUBLICATIONS

U.S. Appl. No. 17/146,463, filed Jan. 11, 2021, Waggoner et al.
U.S. Appl. No. 17/377,259, filed Jul. 15, 2021, Waggoner et al.
U.S. Appl. No. 17/539,833, filed Dec. 1, 2021, Waggoner et al.
U.S. Appl. No. 17/567,796, filed Jan. 3, 2022, Waggoner et al.
U.S. Appl. No. 17/567,799, filed Jan. 3, 2022, Waggoner et al.
U.S. Appl. No. 17/567,801, filed Jan. 3, 2022, Waggoner et al.
U.S. Appl. No. 17/884,553, filed Aug. 9, 2022, Waggoner et al.
U.S. Appl. No. 18/078,080, filed Dec. 8, 2022, Waggoner et al.
PCT/US15/62026, Feb. 5, 2016, ISR and Written Opinion.
PCT US17/21016, Jun. 6, 2017, ISR and Written Opinion.
PCT/US18/19295, May 16, 2018, ISR and Written Opinion.
PCT/US19/48389, Jan. 17, 2020, ISR and Written Opinion.
PCT/US20/62521, May 27, 2021, ISR and Written Opinion.
PCT/US21/41887, Dec. 23, 2021, ISR and Written Opinion.
International Search Report and Written Opinion mailed Nov. 5, 2019 in connection with International Application No. PCT/US2019/055704.
International Preliminary Report on Patentability mailed Apr. 22, 2021 in connection with International Application No. PCT/US2019/055704.
International Preliminary Report on Patentability mailed Jan. 26, 2023 in connection with International Application No. PCT/US21/41887.

[No Author Listed], Diode Bridge. Wikipedia.com. Jul. 26, 2020;6 pages. https://en.wikipedia.org/wiki/Diode.
[No Author Listed], Space Linear Acceleration Mass Measurement Device (SLAMMD). NASA Life Sciences Data Archive; Jul. 15, 2004; 1 page. https://lsda.jsc.nasa.gov/Hardware/hardw/963? /, [last accessed Mar. 5, 2024].
[No Author Listed], Voltage—Confused with diodes and conventional vs real current flow Electrical Engineering Stack Exchange. Electrical Engineering, Feb. 29, 2020;8 pages. https://electronics.stackexchange.com/questions/483777/confused-with-diodes-and-conventional-vs-real-current-flow.
Eron et al., A method of measuring sucking behavior of newborn infants. Psychosomatic Medicine; Journal of Biobehavioral Medicine. 1963;XXV(2):181-91.
Grind et al., Low-Cost Seltzer Fanatics Hack Their SodaStream Machines. The Wall Street Journal, Dow Jones Institutional News; Sep. 21, 2018, 3 pgs.
Prieto et al., Sucking pressure and its relationship to milk transfer during breastfeeding in humans. J Reprod Fertil, Sep. 1996;108(1):69-74. doi: 10.1530/jrf.0.1080069.
Rendon Macias et al., Physiology of nutritive sucking in newborns and infants. Bol Med Hosp Infant Mex Jul.-Aug. 2011;68(4):296-303.

\* cited by examiner

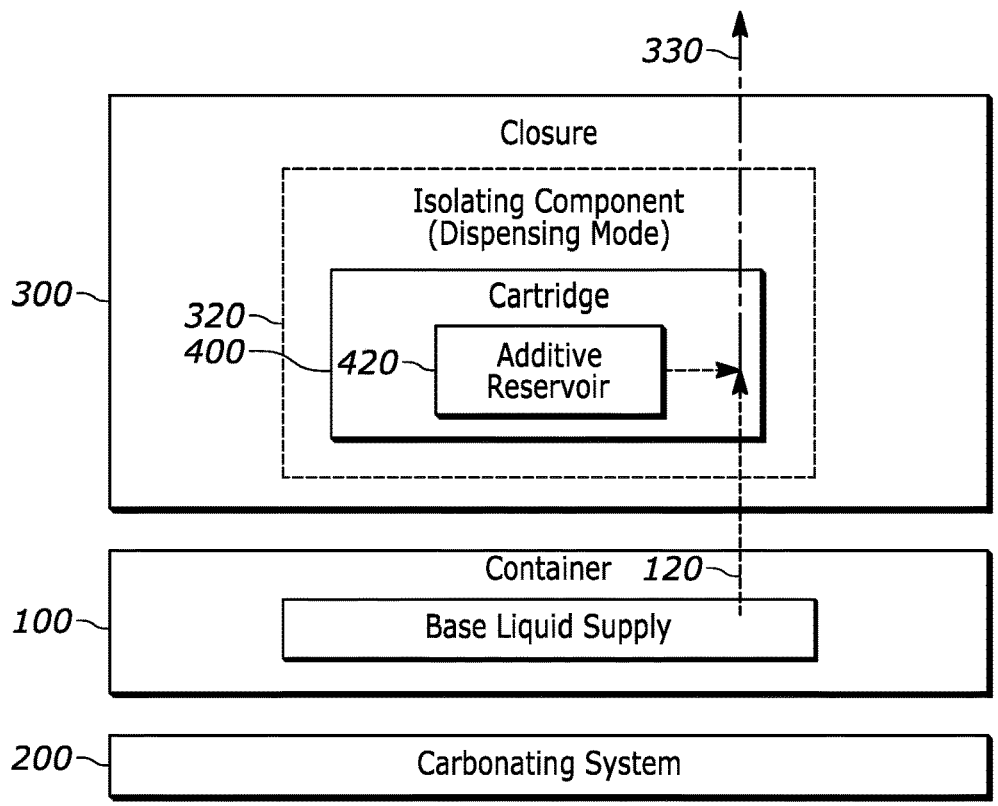
FIG. 8.1
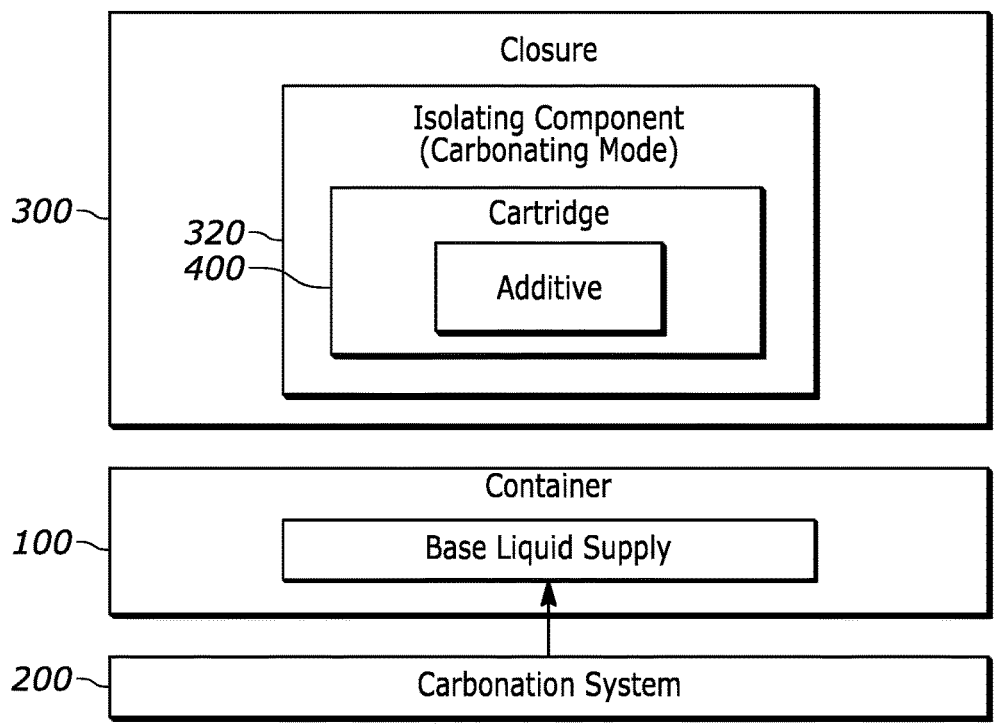
FIG. 8.2

PORTABLE CARBONATING DISPENSERS

PRIORITY CLAIM

Priority is claimed to U.S. Provisional Application 63/052,348, titled PORTABLE CARBONATION SYSTEM, filed on Jul. 15, 2020, which is incorporated by reference herein in its entirety.

FIELD

This disclosure relates generally to beverage forming and dispensing apparatus, systems and associated methods. Such apparatus, systems and methods may provide portable (i.e., handheld) beverage dispensers with onboard, user-controlled carbonation features and may utilize cartridges for adding additives, such as flavorings or supplements, to a base liquid as the base liquid is dispensed. These apparatus, systems and methods may further relate to refill stations for refilling an onboard supply of carbonation gas on a portable carbonating dispenser.

BACKGROUND

Recent advances in the art include beverage forming and dispensing systems that may utilize replaceable cartridges that mix additive with the dispensed base liquid (water). These systems may mix flavoring or other additives with a base liquid (water) as the base liquid is dispensed from a container. Examples of such systems are described in U.S. Pat. No. 10,888,826, granted Jan. 12, 2021, titled ADJUSTABLE ADDITIVE CARTRIDGE SYSTEMS AND METHODS, and US Published Patent Application US20190291065A1, titled ADJUSTABLE ADDITIVE DELIVERY SYSTEMS AND DISPENSING CLOSURE VALVES FOR THE SAME, published on Sep. 26, 2019, both documents of which are incorporated by reference herein in their entirety.

Systems and methods for carbonating beverages are known in the art. For example, tabletop soda preparation systems that permit a user to carbonate their own beverages are known. However, known systems and techniques are not particularly suited for portable beverage dispensers. Moreover, multiple use beverage forming and dispensing systems that may utilize replaceable additive cartridges present additional challenges with regard to adapting carbonation systems and techniques in these environments. There is a need in the art for improvements that address these challenges and others.

SUMMARY

Aspects of the disclosure provide portable (i.e., handheld) carbonating dispensers with onboard carbonation features and components that are modular and suitable for integration while permitting a compact form factor for the dispenser. For example, in some embodiments, a portable carbonating dispenser may include a compact, portable arrangement of an onboard base liquid container, an onboard carbonation module, which may include a carbonation gas container or container and a carbonation flow control assembly, all arranged compactly in an ergonomic housing. A base liquid container closure may sealingly engage the base liquid container such that the interior thereof may be pressurized for carbonation. The onboard base liquid container may be shaped with an alcove or recess to permit compact arrangement of the carbonation gas container. The carbonation flow control assembly may include flow and pressure control components integrated into a module disposed in a base of the housing for ease of assembly and compactness and may include a user-actuated flow control component, including a button, accessible from the housing exterior, for controlling the flow of carbonation gas into the base liquid supply contained in the base liquid container and thus the level of carbonation. The carbonation flow control assembly may include a refill connection for receiving refill carbonation gas from a refill station supply to refill the onboard carbonation gas container. The portable carbonating dispenser permits a user to carbonate a base liquid to a desired level within the dispenser itself in portable fashion and without the need for larger (i.e., tabletop) carbonation system. The portable carbonating dispenser also permits refilling of base liquid and carbonation gas for multiple uses for carbonating and dispensing carbonated water or a carbonated beverage.

Aspects of the disclosure provide portable carbonating dispensers with features for isolating a dispensing passage from exposure to carbonation pressure during carbonation. For example, in some embodiments, a portable carbonating dispenser may include base liquid container closure having a dispensing passage therein and having an isolating component, which may be integrated into the base liquid container closure, for isolating the dispensing passage from the base liquid supply and base liquid container interior to facilitate pressurization of the base liquid container and carbonation of the base liquid. In one embodiment, the isolating component may include a closure insert that may be actuated with a mode selector lever on the closure to configure the portable carbonating dispenser to a carbonation mode or a dispensing mode. The insert may rotate within a journal formed in the container closure and may have one or more insert ports and blocking surfaces which cooperate with respective journal ports to selectively block or align with the journal ports and selectively isolate the dispensing passage from the base liquid container interior (carbonation mode) or expose the dispensing passage to the base liquid container interior (dispensing mode). By operating the mode selector lever, the user may selectively configure the portable carbonating dispenser to carbonation mode or dispensing mode. The dispensing passage may be isolated and protected from exposure to the carbonation gas pressure in the base liquid container during carbonation.

Aspects of the disclosure provide carbonation features that are particularly suited to dispenser environments that utilize replaceable additive cartridges, which features may selectively isolate and protect the additive cartridge during carbonation operations. For example, in some embodiments, a portable carbonating dispenser may be used with an additive cartridge installed in the container or container closure, for example, in a cartridge receiving space in the container closure dispensing passage. The portable carbonating dispenser isolating component may thereby isolate the additive cartridge and protect it against exposure during carbonation mode and may permit base liquid to flow into the dispensing passage and through the cartridge in a dispensing mode. In one embodiment, the isolating component may include a closure insert that may be actuated with a mode selector lever on the closure to configure the portable carbonating dispenser to a carbonation mode or a dispensing mode. The insert may rotate within a journal formed in the container closure and may have one or more insert ports and blocking surfaces which cooperate with respective journal ports to selectively block or align with the journal ports and selectively isolate the additive cartridge from the base liquid container interior (carbonation mode) or expose the dispensing passage to the base liquid container interior (dispensing mode). By operating the mode selector lever, the user may selectively configure the portable carbonating dispenser to carbonation mode or dispensing mode. The additive cartridge may be isolated and protected from exposure to the carbonation gas pressure in the base liquid container during carbonation.

Aspects of the disclosure provide features to enhance carbonation within a portable carbonating dispenser base liquid container. In some embodiments, portable carbonating dispensers may include features for enhancing carbonation. In one embodiment, the onboard base liquid container may be provided with an asymmetrical shape, including an extended portion or well, which contains a deep column of supply liquid of greater depth than other portions of the base liquid container. A carbonation gas injector or nozzle may be disposed at the bottom of the base liquid container extended portion such that carbonation gas undergoes prolonged exposure to the base liquid supply while traveling in the extended portion, thereby enhancing carbonation.

Aspects of the disclosure provide simplified user operation and control of carbonation on a portable carbonating dispensers. In some embodiments, the portable carbonating dispenser may be provided with additional features for preventing the dispensing passage and additive cartridge, if present, from exposure to carbonation pressure during a carbonation operation. For example, the closure may be provided with a vent that may be actuated to vent pressure from the base liquid container following a carbonation operation and before the portable carbonating dispenser is configured to a carbonation mode. The vent may be a push button valve located on the container closure. Moreover, the mode selector lever may be provided with a ramped or other surface for actuating the vent push button valve as the mode selector lever is moved from a carbonation mode position to a dispensing mode position. Venting of the base liquid container may thus occur automatically when the user operates the mode selector lever such that any residual carbonation pressure in the base liquid container is vented prior to the user dispensing base liquid from the container for consumption.

In some embodiments, the portable carbonation dispenser may be provided with other features for preventing exposure of the dispensing passage and additive cartridge, if present, to carbonation pressure. For example, the closure may be provided with a carbonation level indicator, which may be a spring biased post or flag that is extended upward by base liquid container pressure when the base liquid supply is pressurized. The indicator may then visually indicate to the user that the base liquid supply is under pressure. According to a further aspect, the mode selector lever may be provided with a stop tab that is arranged to engage the carbonation level indicator post or flag to thereby prevent movement of the mode selector lever from a carbonation position when the base liquid container is under pressure. This feature, particularly in combination with the vent, provides additional protection against the dispensing passage and additive cartridge, if present, being exposed to excessive pressure from the base liquid container. According to a further aspect, the container closure may be provided with a relief valve to ensure that the base liquid container pressure never exceeds a threshold safety level. The relief valve may also permit the user to control carbonation by ensuring that the carbonation pressure stays at a substantially constant value during carbonation.

According to another aspect, the portable carbonating dispenser includes user interface features for assisting the user in performing the carbonation operation. For example, an elongate, axially extending viewing window may be provided on the base liquid container and arranged to extend through the portable carbonating dispenser housing such that the interior of the base liquid container and the contained base liquid is visible to the user. The viewing window may be located above the user actuated carbonation button on the housing. A carbonation gas nozzle may be located such that carbonation bubbles are visible through the viewing window during a carbonation operation. These features may provide the user with a visual indication that carbonation is occurring within the base liquid container. In another embodiment, the container closure may be provided with an alignment projection for aligning the mode selector lever therewith to indicate to the user that the lever is in a carbonating mode position or a dispensing mode position.

According to another aspect, a container lid or closures are provided with features for supporting carbonation within an associated container. In one embodiment, the container closure may comprise a closure base having a journal, the journal including at least one journal port defined therein, a closure insert disposed in closure base journal and having a closure insert wall defining a cartridge receiving space, the closure insert wall having least one insert port and at least one blocking surface defined thereon, the closure insert being adapted to rotate within the journal to a carbonation position in which the at least one blocking surface blocks the at least one journal port to isolate the cartridge receiving space; the closure insert being adapted to rotate to a dispensing position in which the at least one insert is aligned with the at least one journal port to permit flow into the cartridge receiving space.

According to another aspect, some embodiments provide a method of preparing a carbonated beverage in a portable carbonation system. The portable carbonation system may comprise an onboard base liquid container, a container closure including a dispensing passage, a gas container for containing a supply of carbonation gas, a carbonation flow control assembly, the carbonation flow control assembly including a user-actuated flow control component for controlling the flow of carbonation gas to the base liquid supply, and an isolating component for permitting a user to selectively isolate the dispensing passage and thereby prevent pressurization of the dispensing passage when the base liquid supply is pressurized by the carbonation gas. The method may comprise filling the onboard base liquid container on the portable carbonation system with a base liquid supply, operating the isolation component to isolate the dispensing passage from the base liquid container; and carbonating the base liquid supply with gas from the onboard gas container. The method may further comprise securing a cartridge to the container closure and isolating the cartridge from the base liquid container during the step of carbonating the base liquid supply. The method may further comprise operating the isolating component to configure the portable carbonating dispenser to a dispensing mode after carbonating the base liquid supply. The method may further comprise operating a vent on the container closure to vent pressure from the base liquid supply after carbonating the base liquid supply. The method may further comprise operating a mode selector lever on the container closure to operate the isolation component. The method may further comprise operating a vent by moving the mode selector lever.

Aspects of the disclosure provide multiple use portable carbonating dispensers that may be refilled with carbonation gas from a refill station. According to a further aspect, the portable carbonating dispenser may be used in conjunction with a refill station. The refill station may include a housing for supporting components of the refill station, a refill gas container disposed in the housing, a portable carbonating dispenser interface for connecting a portable carbonating dispenser to the refill station and for permitting flow of gas from the refill gas container to the portable carbonating dispenser, and a refill gas flow control assembly including a flow control valve for controlling the flow of gas from the refill station gas container to the portable carbonating dispenser interface; the refill gas flow control assembly further including a user-actuated lever for selectively operating the flow control valve. In some embodiments, the portable carbonating dispenser may be refilled (recharged with carbonation gas) using a refill station. The refill station may include a dispenser dock for supporting the portable carbonating dispenser. The dispenser dock may have an alignment recess for receiving and centering the container bottom such that a quick connect fitting is aligned with and engages a refill station connection fitting on a dispenser carbonation control module. A lock release button on the dispenser dock may permit locking and release of the quick connect fitting with the refill station connection fitting. A refill gas container 510 may be arranged and adapted to contain liquified or a gaseous form of carbonation gas, such as carbon dioxide. Carbonation gas is supplied to a refill valve from the refill gas container. A user may actuate the refill valve using an actuation lever once the portable carbonating dispenser is locked in place. During a refill operation, carbonation gas is thus supplied from the refill gas container to the portable carbonating dispenser through an onboard gas container refill manifold in the onboard carbonation gas flow control assembly to the onboard gas container. During refill, pressure in the onboard gas container may be controlled using a relief valve on the container closure which may provide an audible indication to the user that the onboard container has been completely refilled.

According to a further aspect, some embodiments provide a method of refilling a portable carbonating dispenser using a refill station. The refill station may comprise a housing, a refill gas container disposed in the housing, a portable carbonating dispenser interface for connecting a portable carbonating dispenser to the refill station and for permitting flow of gas from the refill gas container to the portable carbonating dispenser, and a refill gas flow control assembly including a flow control valve for controlling the flow of gas from the refill station gas container to the portable carbonating dispenser interface, the refill gas flow control assembly further including a user-actuated lever for selectively operating the flow control valve. The method may comprise securing the portable carbonation system to the refill station, filling an onboard gas container on the portable carbonation system from the refill gas container, removing the portable carbonation system from the refill station, carbonating the base liquid supply with gas from the onboard gas container, resecuring the portable carbonation system to the refill station, and refilling the onboard gas container from the refill gas container.

The preceding aspects and embodiments are summary examples. These and other aspects and embodiments will be more apparent from the following description, including the drawings, and claims. Unless otherwise defined, all technical and scientific terms used herein have the same meaning as commonly understood by one of ordinary skill in the art to which the described invention pertains. While suitable, example implementations are described below, other implementations, similar to those described herein can be used to practice the invention. All publications, patent applications, and other references mentioned herein are incorporated by reference in their entirety. In case of conflict, the present specification, including definitions, will control. In addition, the examples described herein are illustrative only and are not intended to be limiting in any way. The details of one or more example implementations of the invention are set forth in the accompanying drawings and the description below. Other features, objects and advantages of the invention will be apparent from the description and drawings, and from the claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto. The following Figures, unless otherwise indicated, illustrate example apparatus, systems or methods in illustrative embodiments and according to aspects of the disclosure.

FIGS. 8.1 and 8.2 are schematic illustration of an example cartridge isolating component in a dispensing mode and isolating mode, respectively;

DETAILED DESCRIPTION

Figure 1:
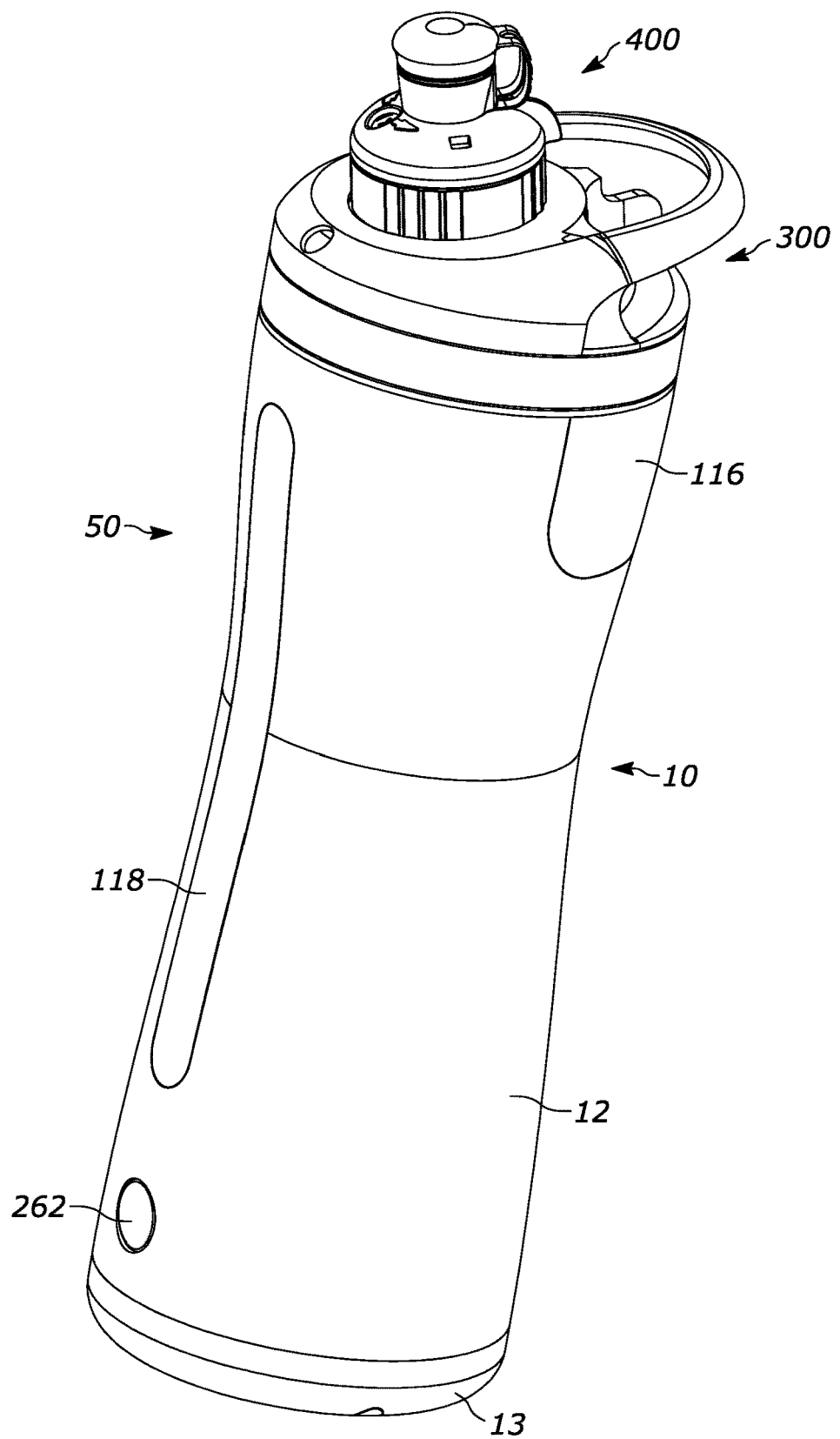
FIG. 1 is a front perspective view of an example portable carbonating dispenser.
Figure 2:
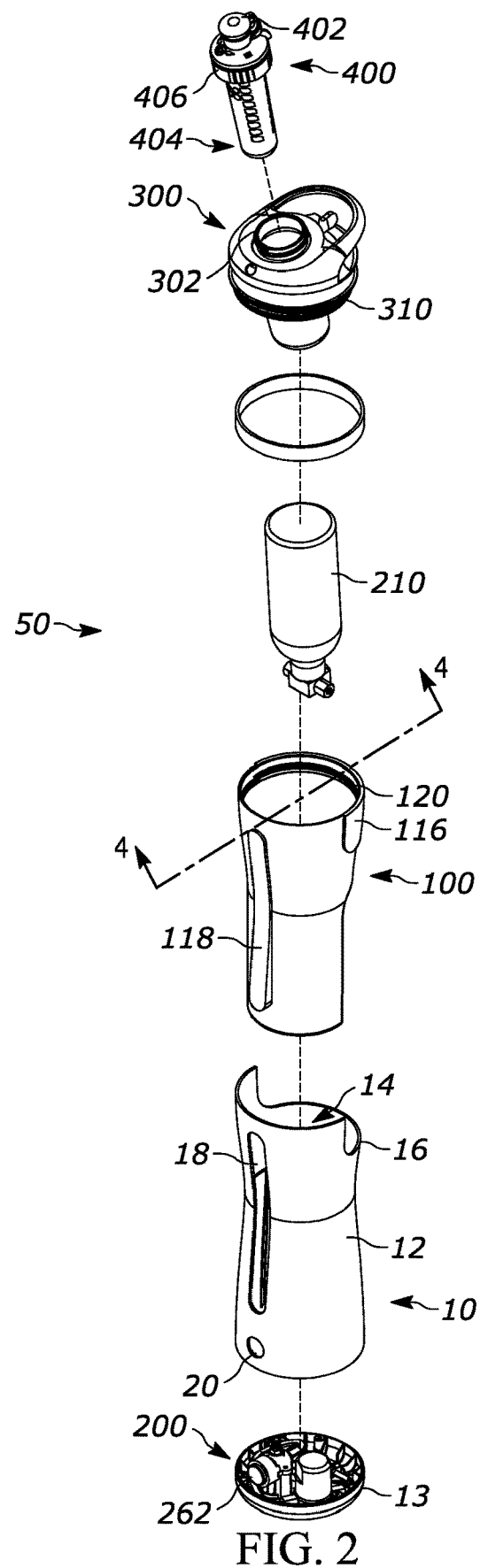
FIG. 2 is an exploded front perspective view of the FIG. 1 example.
Figure 3:
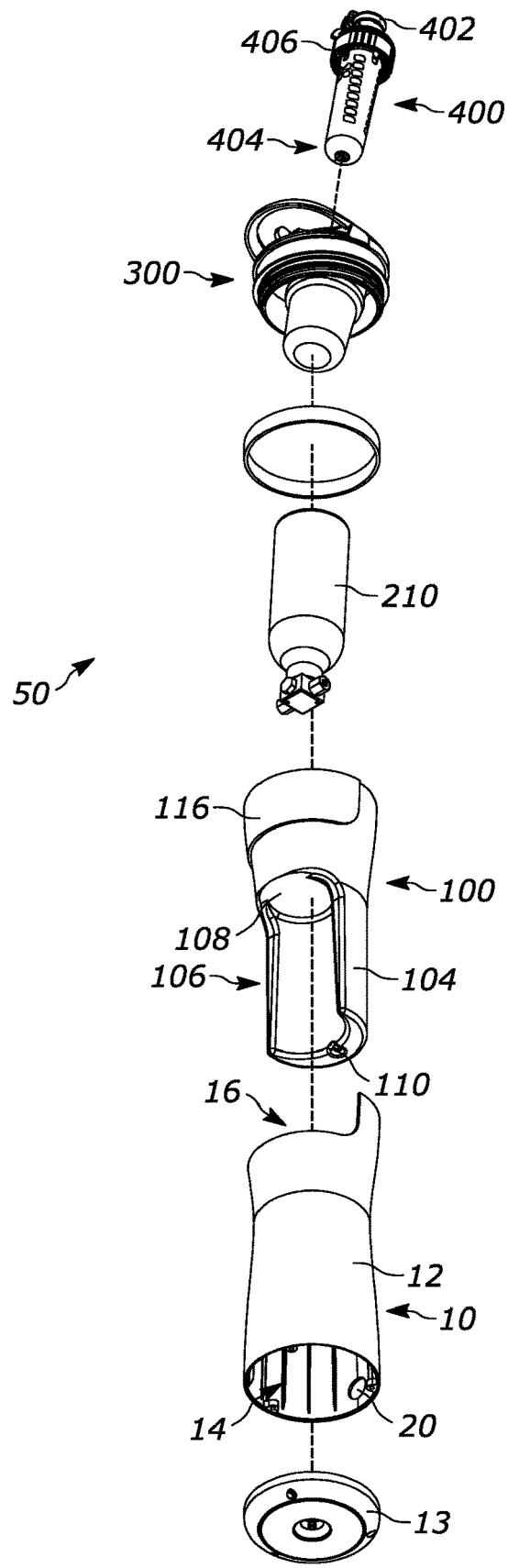
FIG. 3 is an exploded rear perspective of the FIG. 1 example.

An example portable carbonating dispenser according to aspects of the disclosure is illustrated in FIGS. 1-11. Referring more particularly to FIGS. 1-3, the portable carbonating dispenser 50 may include the following main components: a housing 10, base liquid container 100, carbonation module 200, and closure 300, which may receive an additive cartridge 400. Base liquid container 100 and carbonation module 200 may be installed in a compact manner within housing 10. Housing 10 may include an outer wall 12 having a generally cylindrical or hourglass ergonomic shape suitable for user gripping, and a separate housing base 13, which may be removably secured to a bottom portion of housing 10. Outer wall 12 and housing base 13 may define an interior space 14 for housing other system components. Housing 10 may include an elongate, axially extending viewing window cutout 18, which may receive a complementary-shaped, transparent base liquid container viewing window 118 formed on the base liquid container 100 to permit a user to view the interior thereof. Housing 10 may further include a button cutout 20 for receiving a carbonation control button 262 on carbonation module 200. The carbonation control button 262 may be recessed within the housing 10 in order to prevent inadvertent actuation. A recessed top portion 16 of housing 10 may receive and align with a complementary-shaped, circumferentially extending overhang 116. These complementary fitting elements may provide a secure fit, aid in positioning during assembly, and add to the visually interesting effects of the overall portable carbonating dispenser 50. An internally threaded top end 120 of the base liquid container 100 may receive and secure an externally threaded base 310 of closure 300, which may include an O-ring seal adapted to sustain pressure in the base liquid container 100.

Housing interior space 14 may accommodate a base liquid container 100 for containing a supply of base liquid, such as water, or other beverage precursor liquid. Base liquid container 100 may include an interior chamber 102 having an asymmetrical shape, which advantageously improves carbonation of the base liquid. More particularly, interior chamber 102 may include an extended section or well 104 which has an increased depth. A carbonation gas nozzle receptacle 110 may be located beneath the base liquid container extended section 104 and may receive a carbonation nozzle 256 of carbonation flow control assembly 220. A small passage in the carbonation gas nozzle receptacle permits a flow of carbonation gas to introduced to the base liquid in a bottom portion of the extended section 104. Extended section thus provides for extended exposure of base liquid to carbonation gas as carbonation gas travels upward through the extended depth of base liquid, thereby increasing the level of carbonation achieved compared to base liquid container without this feature, for example. In addition, as best shown in the cross-section in FIG. 4, the asymmetric shape of the base liquid container 100, including the extended section 104 and an intermediate floor 108, may define an alcove or recess 106, which may accommodate an onboard carbonation gas container 210 and provide for compact arrangement of the carbonation gas container 210 and base liquid container 100 within the housing 10.

Figure 5:
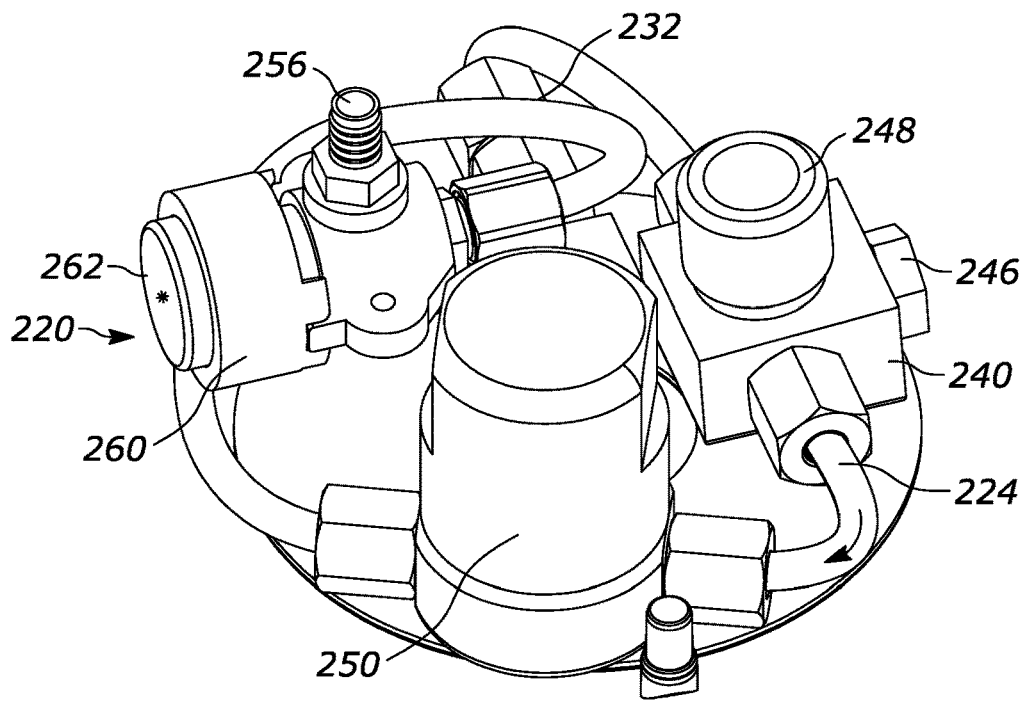
FIG. 5 is front perspective of a carbonation flow control assembly of the portable carbonating dispenser of FIGS. 1-4.
Figure 6:
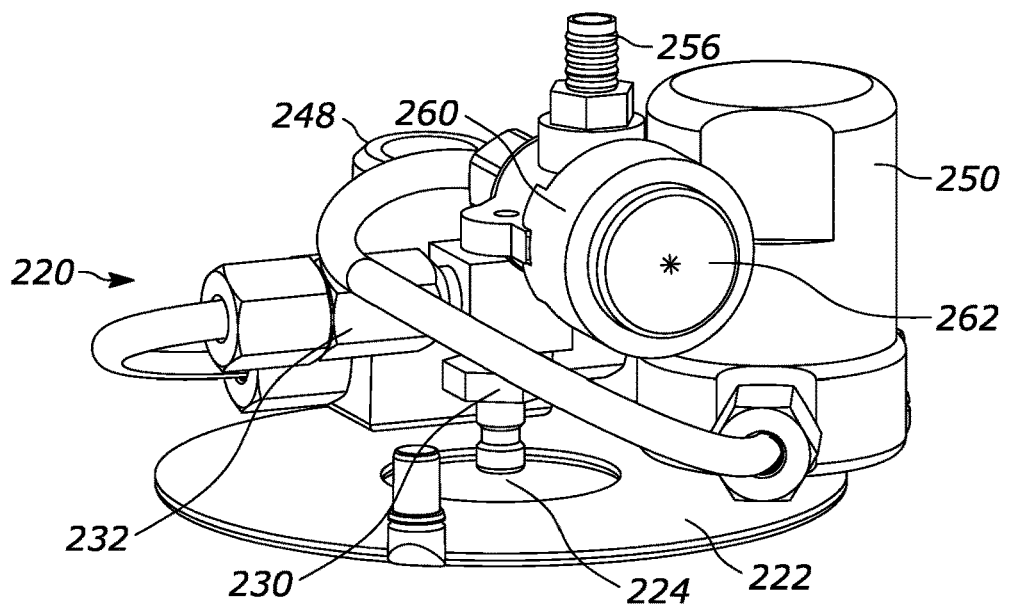
FIG. 6 is side perspective of the carbonation flow control assembly of FIG. 4.
Figure 7:
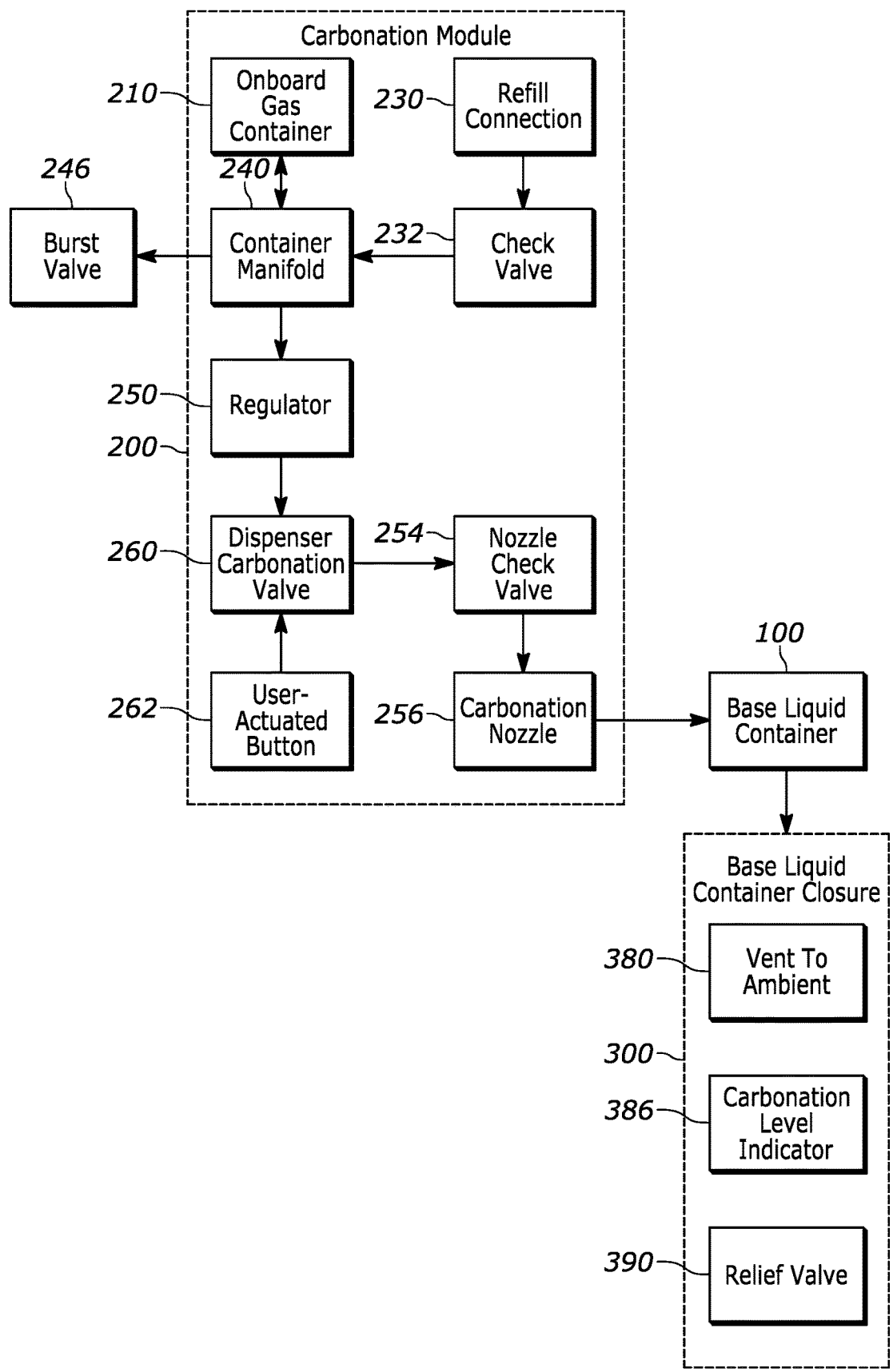
FIG. 7 is a block diagram of components of a portable carbonating dispenser.

Referring more particularly to FIGS. 5-7, carbonation module 200 may include an onboard carbonation gas container 210 and a carbonation gas flow control assembly 220, which may comprise components for controlling the flow and pressure of carbonation gas delivered to the base liquid contained in the base liquid container 100 and which may provide for refilling of the carbonation gas container 210 from an external refill station, as will be described. Carbonation module 200 may be a compact module that is adapted and arranged to fit within the housing 10 with one or more components, disposed in a lower portion of the housing 10 and secured to a floor panel 222 which may be mounted to the container base 13. This arrangement provides for ease of assembly of the portable carbonating dispenser as the carbonation module can be preassembled prior to being inserted as a unit in the housing 10.

Carbonation gas flow control assembly 220 may include a refill connection fitting 230 disposed in a circular recess 224 in floor panel 222 to allow for alignment of the refill connection fitting with mating components on a refill station. FIG. 7 illustrates example fluid (gas) circuitry and interconnections between components of the carbonation module 200. Physically, these components may be connected with suitable tubing for conveying carbonation gas between components. Refill connection fitting 230 may receive refill carbonation gas, which then flows through a check valve 232, which prevents backflow. Carbonation gas then flows through a container 4-port manifold 240, which may contain an onboard gas container fitting 248 (see FIG. 4 additionally) for interfacing with the onboard gas container 210. Container manifold 240 thus permits refill into and outflow from the onboard gas container 210. Container manifold 240 may also include an integrated burst disk 246, which functions as a safety relief valve against excessive pressure in the onboard gas container 210 and other components in the circuit. Container manifold 240 also conveys gas from the onboard gas container 210 to a pressure regulator 250, which may modulate (i.e., maintain a constant pressure) in the circuit downstream of the regulator 250 and in carbonation gas provided to a dispenser carbonation valve 260, which may be actuated by a user push button to permit carbonation gas to flow through a nozzle check valve 254 and to the carbonation nozzle 256 to thereby provide carbonation gas flow into the base liquid container 100 and base liquid contained therein. Carbonation module 200 thus permits a user to provide a desired level of carbonation to the base liquid by activation of the user-actuated button 262.

FIG. 7 illustrates additional components that may be included in a base liquid container closure or lid 300. Closure 300 provides a suitable seal of the base liquid supply in order to permit the interior of the base liquid container 100 to be pressurized to sufficient levels to cause carbonation gas to be dissolved in the base liquid. Closure 300 may also include components for controlling and indicating (sensing) carbonation pressure within the base liquid container 100. These components may include a vent (to ambient) 380, a carbonation level indicator 386 and a relief valve 390. The function of these components will be explained in more detail subsequently in this disclosure.

Figure 4:
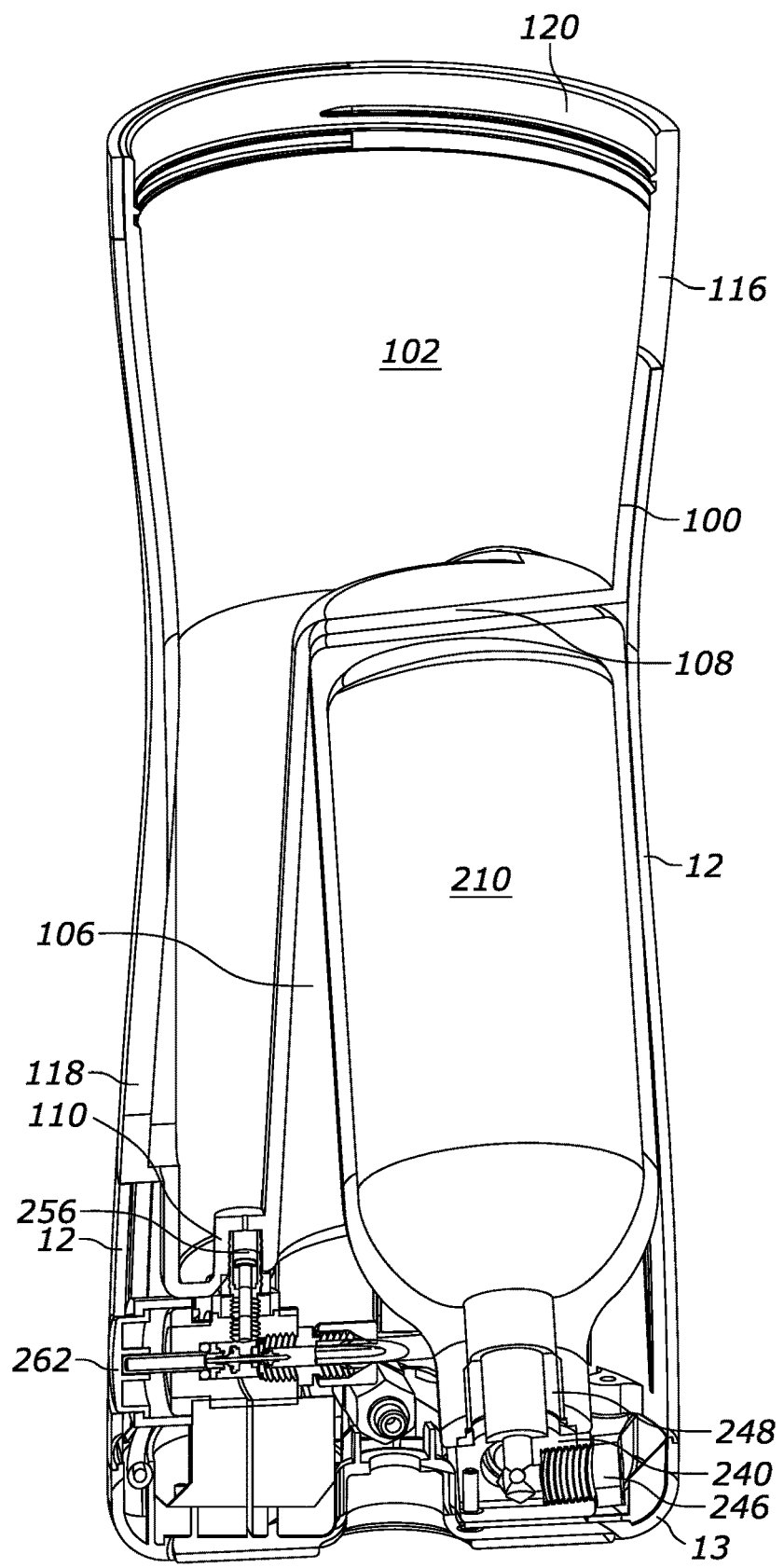
FIG. 4 is a cross-section of a housing, base liquid container, carbonation module and other components illustrated in FIGS. 1-3, the cross-section being taken in plane 4-4 in FIG. 2.

Carbonation systems according to the disclosure may be particularly adaptable to dispensers that utilize replaceable additive cartridges. For example, closure 300 may provide for the installation of a replaceable flow-through additive cartridge 400. Such cartridges 400 may include features similar to those described in the above-referenced U.S. Pat. No. 10,888,826. Cartridge 400 may be installed in a dispensing passage of a container lid or closure and may have a configuration and features that cause additive to be mixed with base liquid as the base liquid flows through the cartridge. Such a cartridge may also provide user adjustment of the amount of additive added to the base liquid flow by rotation of a flavor dial on the cartridge. Referring to FIGS. 2-4 of this disclosure, cartridge 400 may have a dispensing spout 402, an opposite inlet end 404 having one or more passages to permit the inflow of base liquid, and a threaded base 406 for securing the cartridge 400 to a threaded dispensing passage 302 in closure 300.

According to aspects of the instant disclosure, features are provided to support carbonation in dispenser environments that include additive cartridges described above. More particularly, features are provided for isolating the additive cartridge from the base liquid supply and accompanying higher pressures within the base liquid container during carbonation. It will be understood that the isolating component described herein also isolates the dispensing passage 302 of closure 300 and may be utilized as such in cases (i.e., where a user is carbonating and dispensing only water in the portable carbonating container) where an additive cartridge is not in use or present in the dispensing passage 302. FIGS. 8.1 and 8.2 schematically illustrate an isolation component arrangement, in which features may be provided a container closure 300 to provide for selective isolation of an additive cartridge (or dispensing passage, which may be assumed to be represented by the same block 400) during a carbonation operation in a portable carbonating dispenser. An isolating component 320 may provide a selectively permeable barrier which, in a dispensing mode (FIG. 8.1), is arranged and adapted to expose the cartridge to base liquid flow and permit dispensing operation of the container closure 300 in which a flow (long dashed line) 120 of base liquid results in additive flow 420 (short dashed line) and a mixed flow 330 (short/long dashed line) from the cartridge spout. In this mode the isolation barrier is permeable, represented by the dotted line defining the isolation component 320. Isolating component 320 may be configured to a carbonation mode (FIG. 8.2) in which the permeable barrier is arranged and adapted to isolate the cartridge from the base liquid supply and container such that the cartridge 400 is not exposed to carbonation pressure developed therein by the carbonation module 200. In this mode, the isolation barrier is impermeable and able to isolate the dispensing passage from pressure in the base liquid container 100, represented by the solid line defining the isolation component 320.

Figure 9:
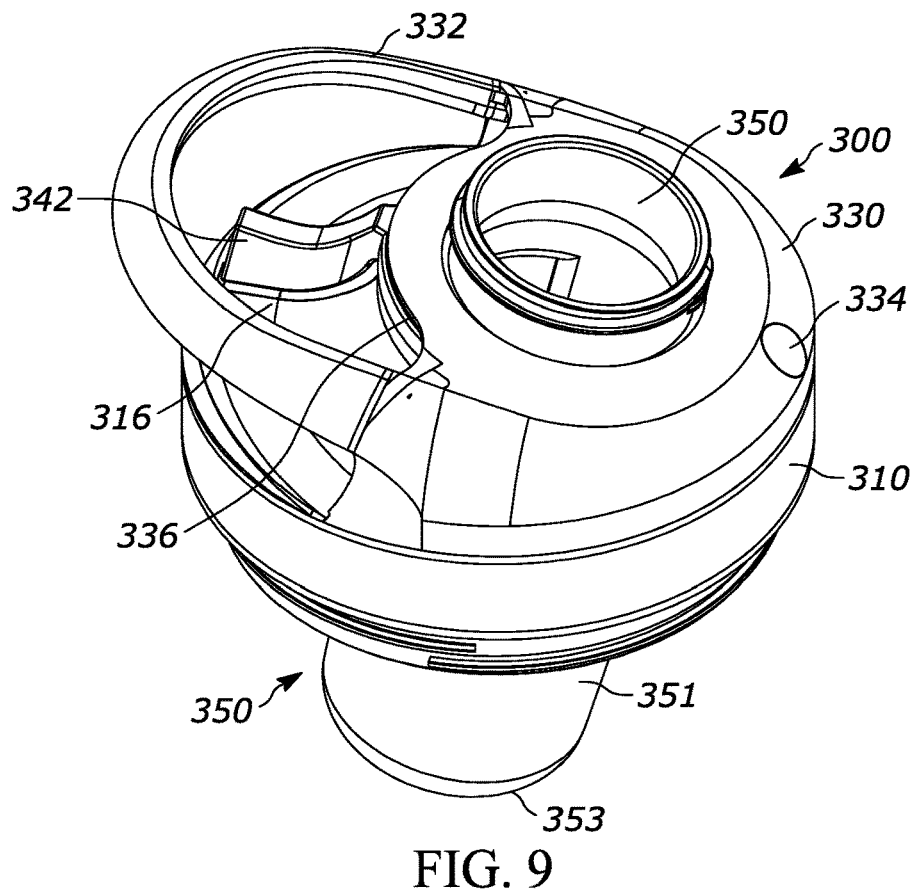
FIG. 9 is side perspective view of a container closure featuring an cartridge isolating component.
Figure 10:
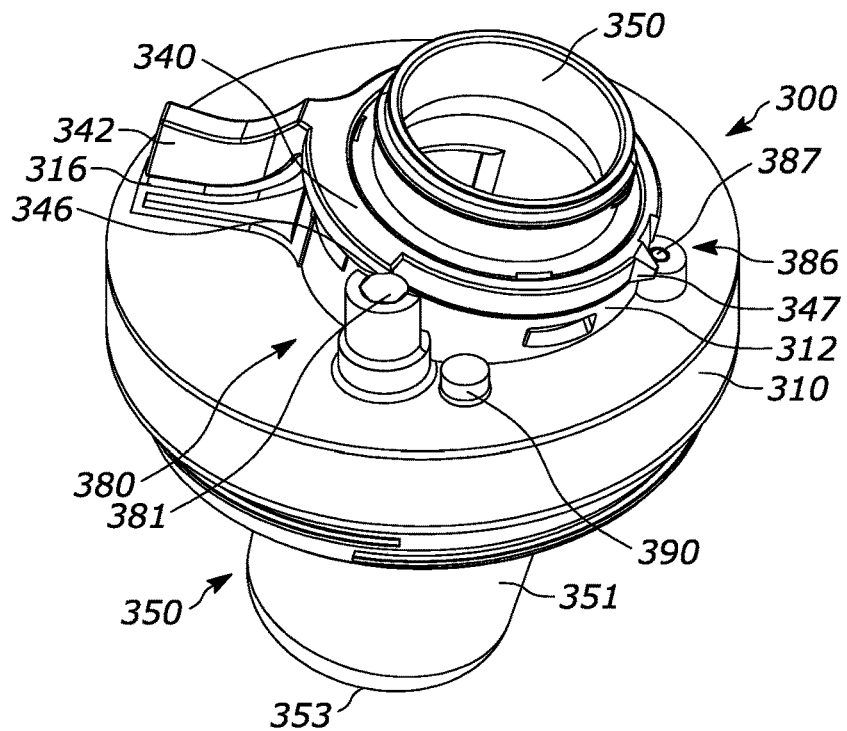
FIG. 10 is a side perspective view of the container closure of FIG. 9 with a handle and shroud assembly removed to illustrate additional features.
Figure 11:
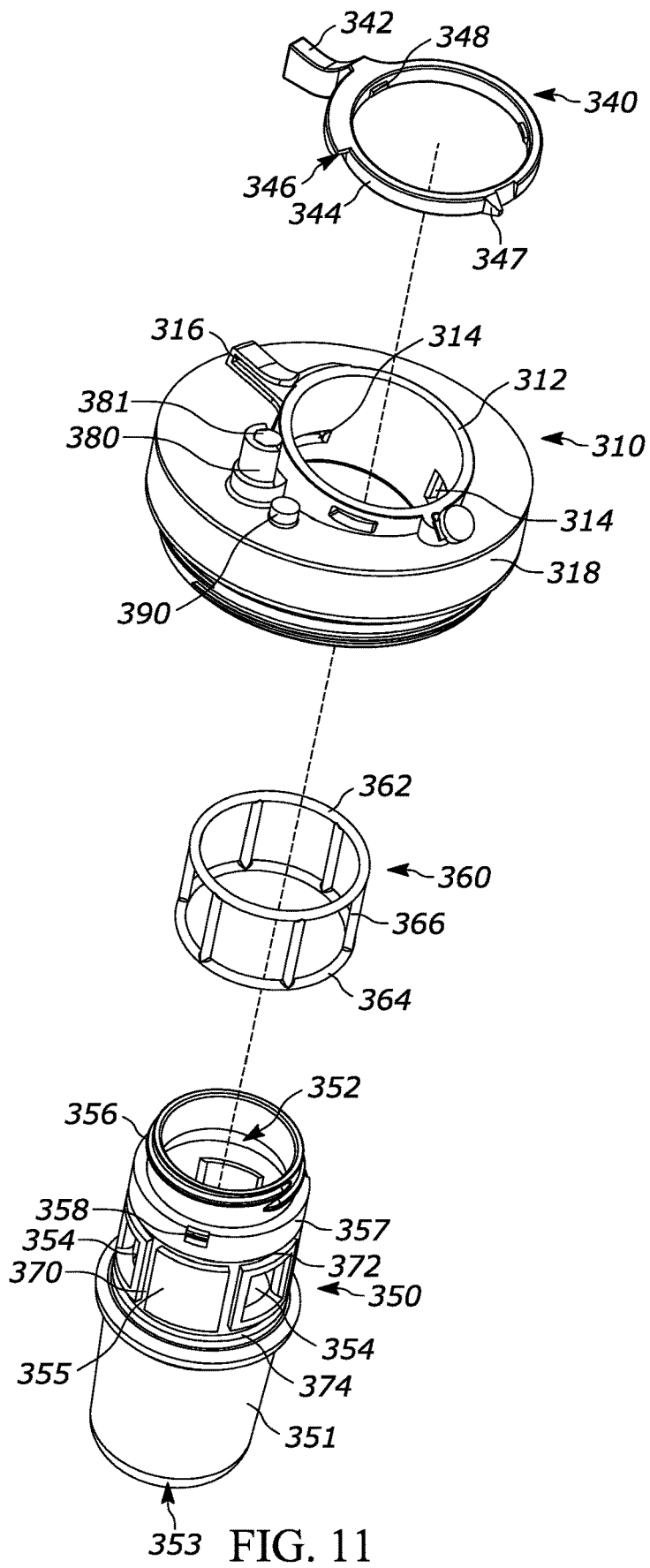
FIG. 11 is an exploded side perspective view of the container closure of FIGS. 9 and 10.
Figure 12:
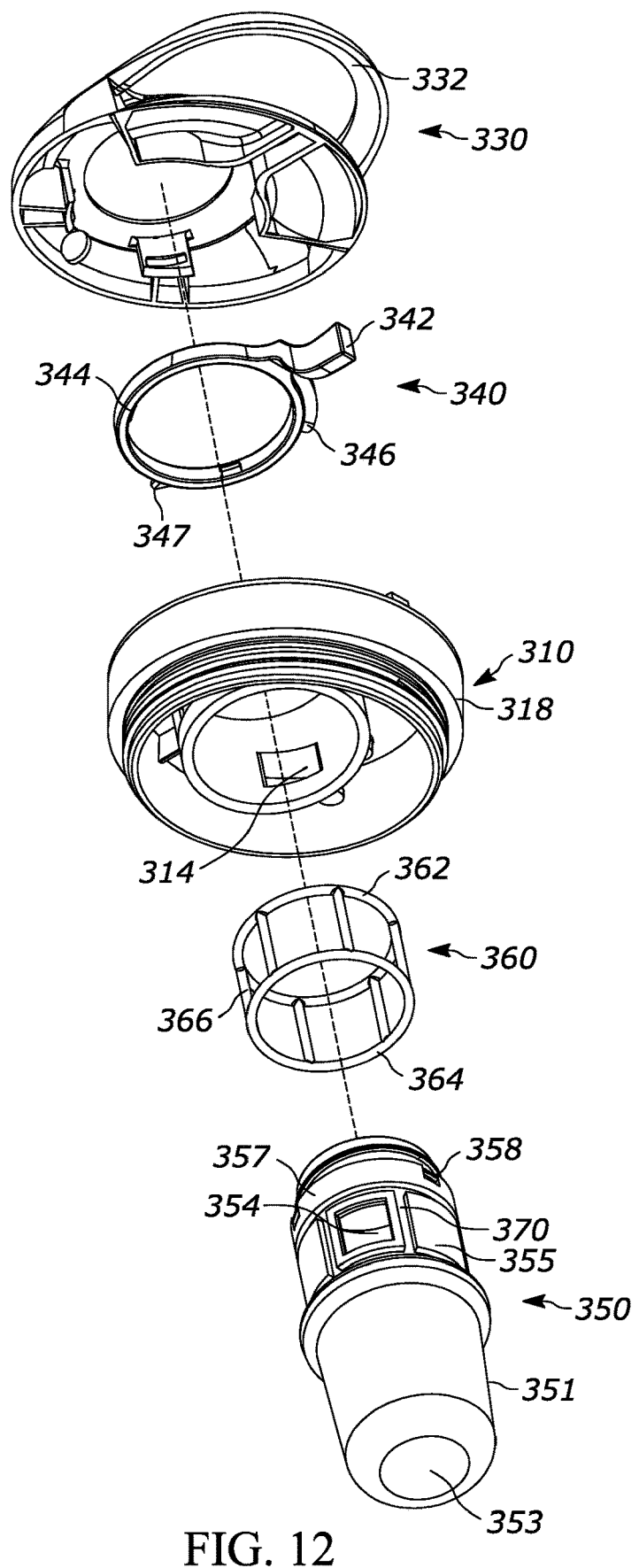
FIG. 12 is an exploded side perspective of the container closure of FIGS. 9-11.

According to further aspects of this disclosure, an example implementation of an isolation component may be provided in a container closure 300 as illustrated in FIGS. 9-11. Major components of the closure 300 may include a closure base 310, closure shroud 330, a closure insert 350, insert seal 360 and actuating lever 340. FIGS. 9 and 12 show the closure shroud 330 whereas FIGS. 10 and 11 omit the closure shroud for clarity. Closure shroud 330 may include an integrated handle 332. Closure base 310 may include an annular journal 312 for receiving the closure insert 350 and one or more journal ports 314, which are arranged to permit flow of base liquid from the base liquid container interior to the interior of journal 312. Two journal ports 314 are shown in FIG. 11 (a third is hidden from view). Closure base 310 may include a vent 3, which may be a spring biased button 381 adapted to release pressure in the base liquid container when depressed relative to the closure base 310 by a user or by a ramp surface 346 on the actuation lever 340, as will be further described subsequently in this disclosure. A relief valve 390 may also be included on the closure base 310 and may feature a poppet or other type valve that releases pressure when a threshold pressure is reached, and thus is capable of controlling and maintaining a limited pressure within the base liquid supply container. Closure base 310 may include an over-molded grip ring 318 to permit user gripping and removal or installation of the closure 300 relative to the base liquid container 100.

Closure insert 350 may include a cylindrical outer wall 351 extending to an end wall 353 to define an interior cartridge receiving space 352 for receiving an inlet end 404 (see FIGS. 2 and 3) of cartridge 400. Cartridge receiving space 352 also provides part of a dispensing passage, as will be recognized. A threaded end 356 of the insert 350 may engage the threaded cap 406 of cartridge 400 to secure the cartridge 400 to the insert. A number of snap fit recesses 358 may be provided on a cylindrical lever receiving surface 357 to secure a mode selector lever 340 to the closure insert 350 after assembly into the closure base 310. Closure insert 350 may include a number (in this case three) insert ports 354, which may permit flow of base liquid from the exterior into the interior cartridge receiving space 352. Interspersed between the insert ports 354 are a number of blocking surfaces 35. Insert 350 may include a seal retaining channel 370 having two circumferentially extending upper and lower segments 372 and 374, and a number of axially extending segments 376 extending between the upper and lower segments 372 and 374. Seal retaining channel 370 may receive a resilient (i.e., modified O-ring) insert seal 360 having a complementary shape with two rings 362 and 364 and a number of axially extending cross members 366.

As will be recognized from the instant disclosure, when closure insert 350 is installed and seated within the closure base journal 312, insert ports 354 and blocking surfaces 355 are arranged to cooperate with the journal ports 314 on the closure base 310. Rotation of the insert 350 to a dispensing position brings the insert ports 354 into alignment with the journal ports 314 and base liquid may thus flow to the interior cartridge receiving space 352. Rotation of the insert 350 to a carbonation position brings the blocking surfaces 355 into alignment with the journal ports 314 such that the interior cartridge receiving space 352, and thus an installed cartridge 400, is isolated from the base liquid container such that carbonation pressure may be applied therein without affecting the cartridge 400. In this example, the described features on the insert 350 and closure base 310 cooperate to provide an isolation component, which allows a user to selectively isolate the cartridge from pressure in the base liquid container 100. As will be recognized, insert seal 360 provides for sealing of the insert within the closure base journal 312 while rotation occurs. Insert seal 360 also provides for respective sealing engagement of each of the blocking surfaces 355 with the interior wall of closure base journal 312 and provide a seal that completely surrounds each of the journal vents 314 when the insert 350 is in a carbonation position, thus providing a seal against the relatively high pressure of the base liquid container 100 during a carbonation operation.

A mode selector lever 340 provides for user actuation (rotation) of the closure insert 350 to configure the closure 300 into a dispensing mode or carbonation mode. Mode selector lever 340 may include an actuation handle 342 and an annular ring 344 adapted to surround the lever engaging surface 357 of the insert 350 when installed thereon. The installed position of mode selector lever 340 on the insert 350 is best illustrated in FIG. 10. A number of snap-fit projections 348 may be provided on an interior surface of the annular ring 344 to engage a like number of snap-fit recesses 358 on the lever engaging surface 357 to provide ease of assembly and fastening of these components.

As best seen in FIG. 9, when the mode selector lever 340 and closure shroud 330 are installed on the closure base 310, the mode selector lever handle 342 may extend through a guide slot 336 in the closure shroud 330, which may guide and provide for limited movement (rotation) of the mode selector lever 340. An alignment projection 316 may extend from the closure base 310 and be contoured to fit with a like surface of the mode selector lever handle 342. Alignment projection may provide a visual and tactile indication of the mode selector lever handle 342 being in a carbonation mode, which is the position shown in FIGS. 9 and 10.

In accordance with aspects of the disclosure, the closure 300 may be provided with additional features to control carbonation pressure and ensure that the cartridge 400 is not exposed to carbonation pressure during operation. Closure 300 may be provided with an interlock feature which prevents a user from switching to a drinking mode if the base liquid supply is pressurized. In an illustrative embodiment, the mode selector lever 340 may be provided with a stop tab 347 (FIGS. 9-11) and the closure base 310 equipped with a retractable carbonation level indicator flag or post 387, which is positioned to project upward from the closure base 310 when suitable carbonation pressure is achieved in the base liquid container 100. Carbonation level indicator post 387 is shown in a retracted position within the container base 310 in FIG. 10. When the base liquid container is pressurized with carbonation gas, post 387 may extend upward and prevent movement of the stop tab 347 and thus prevent the user from switching the portable carbonating dispenser to a dispensing mode. As will be recognized, carbonation level indicator post 387 may be positioned to be viewed by a user through a transparent viewing lens 334 (FIG. 9) in the closure shroud 330.

According to a further aspect, the closure 300 may be provided with a vent 381 for venting pressure from the base liquid container 100. Vent 381 may be a push button type valve with an exposed actuation surface extending from the closure base 310 and housed within a pedestal on the closure base. The vent surface may be arranged and adapted to be engaged by a ramped surface 346 on the mode selector lever 340, which engages the surface and depresses the button as the mode selector lever 340 is rotated (counterclockwise in FIGS. 9 and 10). Vent 381 may thus ensure that pressure is vented to ambient/atmosphere from the base liquid container 100 as the user switches the dispenser to a dispensing mode and before the interior cartridge receiving space 352 of the insert 350 is exposed to the base liquid supply. Vent 381 may also be operated directly by the user (i.e., buy engaging the surface of vent 381 with a user's finger, thumb, a pencil point or other element) to vent any pressure build up within the base liquid container 100.

According to a further aspect of the disclosure, closure 300 may be provided with a relief valve 390 which may be set at a threshold pressure to limit the maximum pressure within the base liquid supply container. Relief valve 390 may be of a known construction, having a spring biased sealing element which is set to unseat and relieve pressure above a predetermined limit, typically 60 psi.

Figure 13:
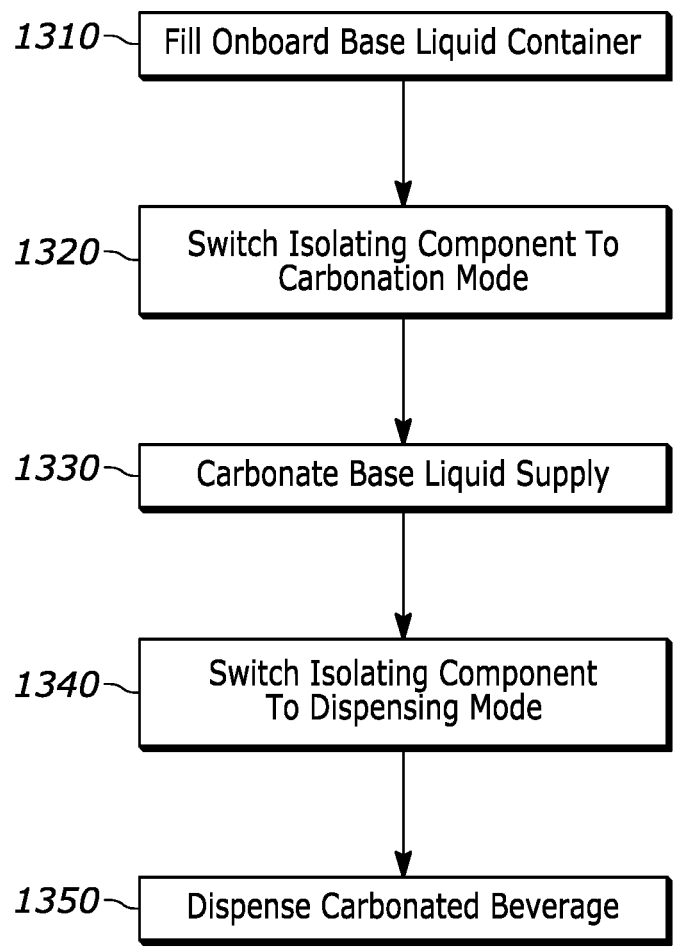
FIG. 13 is a flow chart of a method of using a portable carbonating dispenser.

FIG. 13 illustrates steps in an example method for operating a portable carbonating dispenser such as that described above. At step 1310, a user may fill the base liquid container 100 and then secure the container closure 300. At step 1320, the isolating component is switched to a carbonation mode. At step 1330, the base liquid supply is carbonated by a user depressing the carbonation button 262 (FIG. 1) and thereby releasing carbonation gas from the onboard gas container 210 into the base liquid supply. At step 1340, the isolating component is then switched to a dispensing mode. This step may include intermediate steps of first venting pressure in the base liquid container. At step 1350, the carbonated beverage is then dispensed from the dispenser and may be flavored with additive from the cartridge as base liquid flows through the closure 300.

Figure 14:
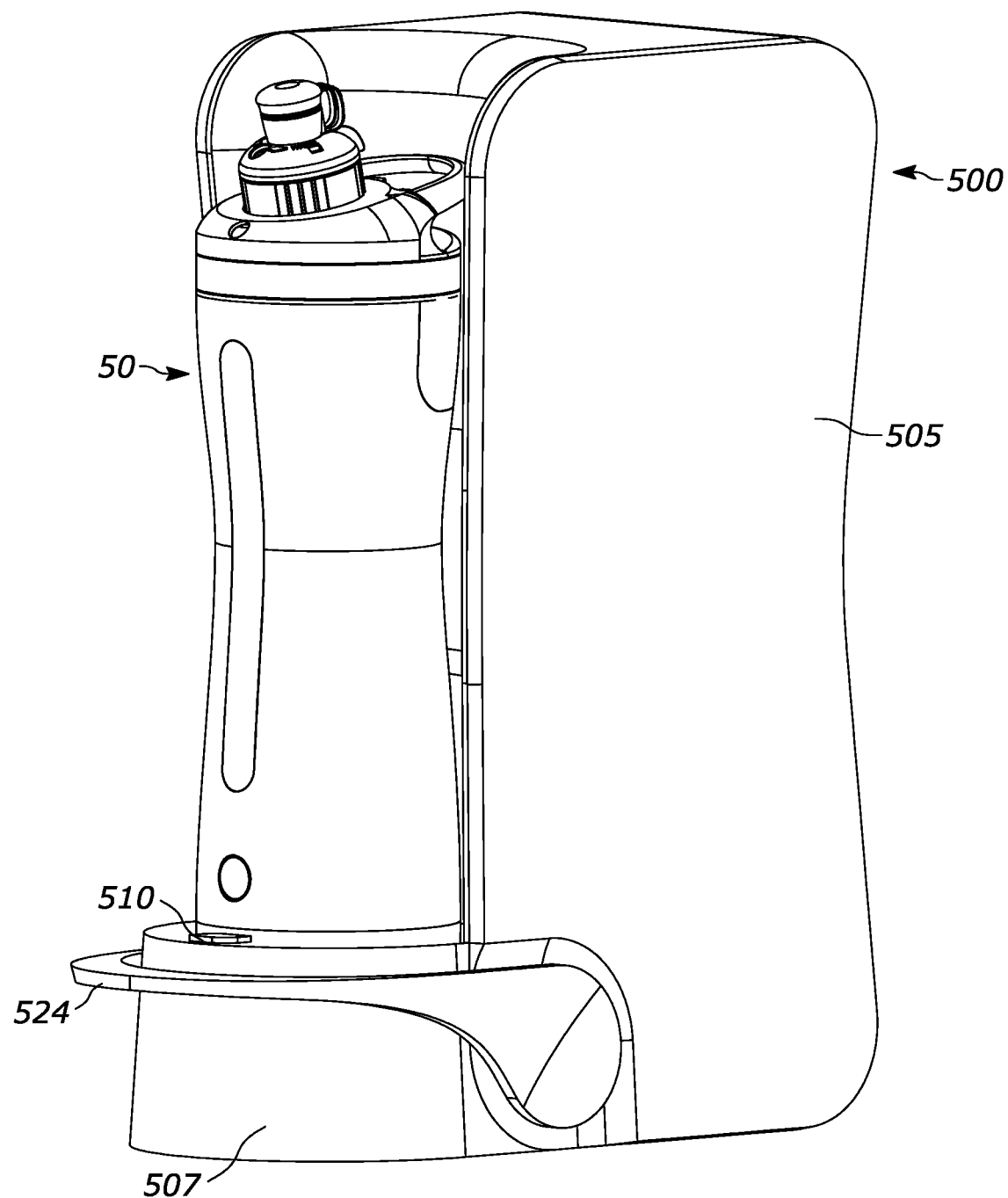
FIG. 14 is front perspective of a portable carbonating dispenser in a refilling position on a refill station.
Figure 15:
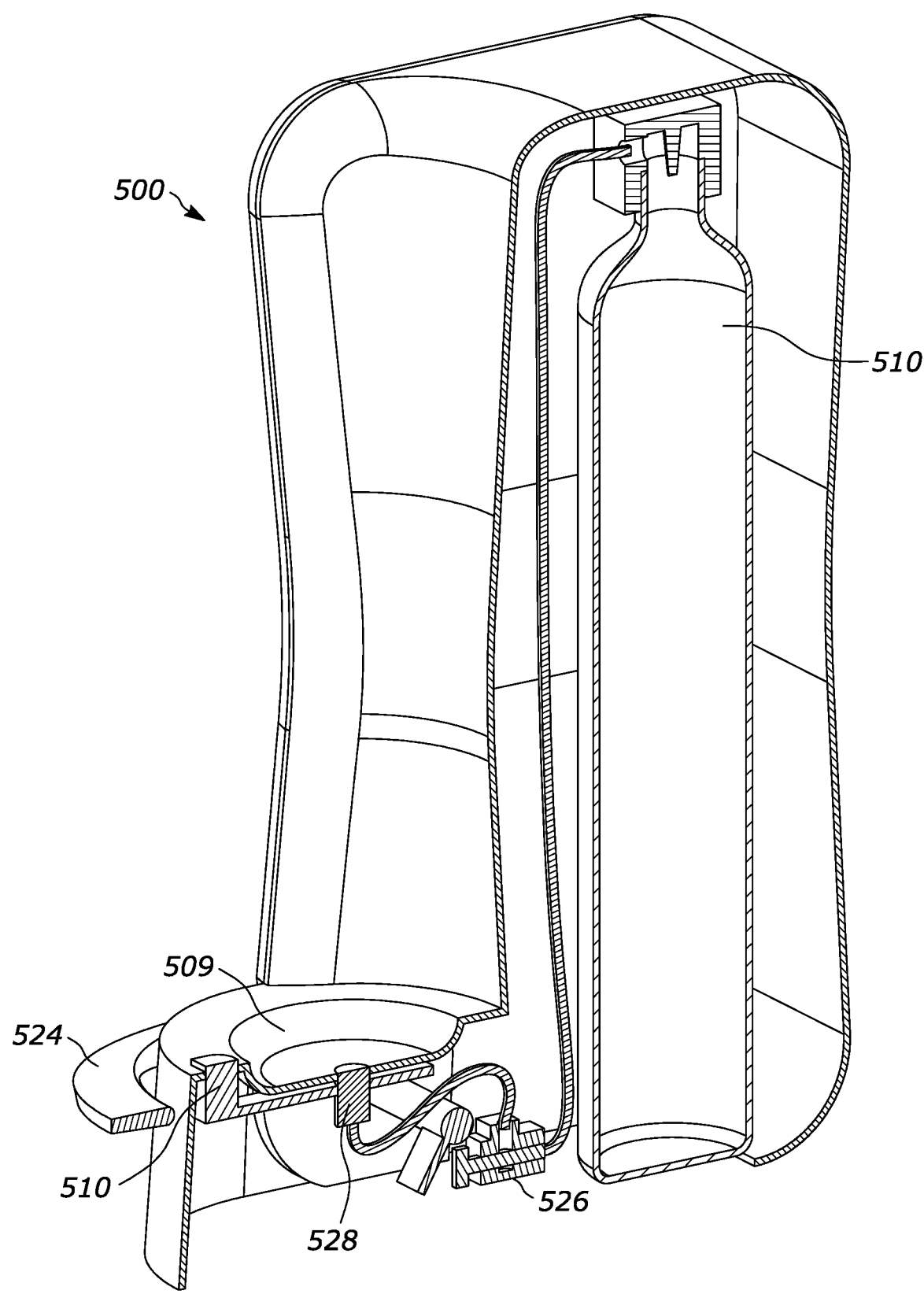
FIG. 15 is a cross-section of the portable carbonating dispenser and refill station of FIG. 14.
Figure 16:
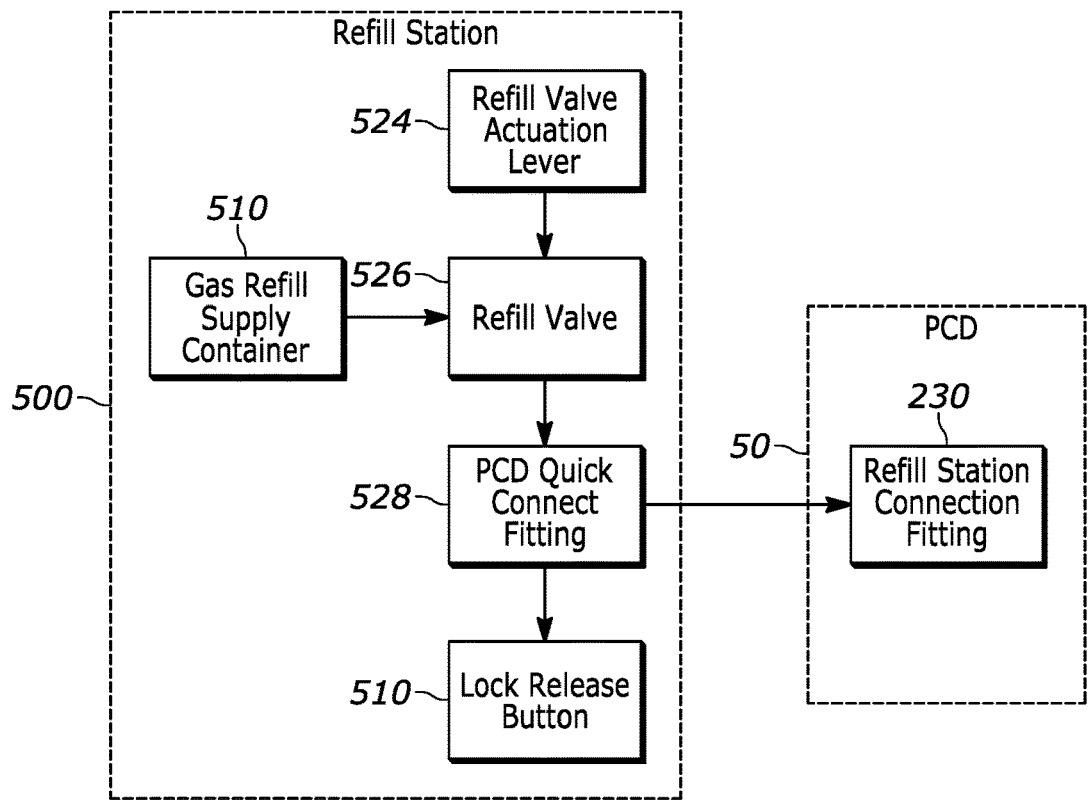
FIG. 16 is a block diagram of components of a refill station.

According to further aspects of the disclosure, the portable carbonating dispenser may be refilled (recharged with carbonation gas) using a refill station. An example refill station 500 arrangement is illustrated in FIGS. 14 and 15. FIG. 16 is a schematic representation of example components of a refill station and their functional relationships. The refill station 500 may include a main housing 505 for housing system components and having a dispenser dock 507 for supporting the portable carbonating dispenser 50. Dispenser dock 507 may have an alignment recess 509 for receiving and centering the container bottom 13 (see FIG. 1) such that a quick connect fitting 528 is aligned with and engages the refill station connection fitting 230 on the dispenser carbonation flow control assembly 220 (see FIG. 6). A lock release button 510 on the dispenser dock 507 may permit locking and release of the quick connect fitting 528 with the refill station connection fitting 230.

Refill gas container 510 may be arranged and adapted to contain liquified or a gaseous form of carbonation gas, such as carbon dioxide. Typically, when carbonating gas is stored in a liquid form, an upper part of the interior space of the gas container 510 will contain a supply of the gaseous form existing in equilibrium with the liquid form residing in a lower part of the interior space. Refill gas container 510 may have an outlet fitting secured to the upper portion thereof to permit supply of gaseous form of carbonation form regardless of the form stored in the container. Carbonation gas is supplied to the refill valve 526 from the refill gas container 510. A user may actuate the refill valve 526 using an actuation lever 524 once the portable carbonating dispenser 50 is locked in place. During a refill operation, carbonation gas is thus supplied from the refill gas container 510, through control valve 526 and through the onboard gas container refill manifold (FIGS. 5 and 7) in the onboard carbonation gas flow control assembly 220 to the onboard gas container 210 (FIG. 4). During refill, pressure in the onboard gas container 210 may be controlled using the relief valve 390, which may provide an audible indication to the user that the onboard container 210 has been completely refilled.

Figure 17:
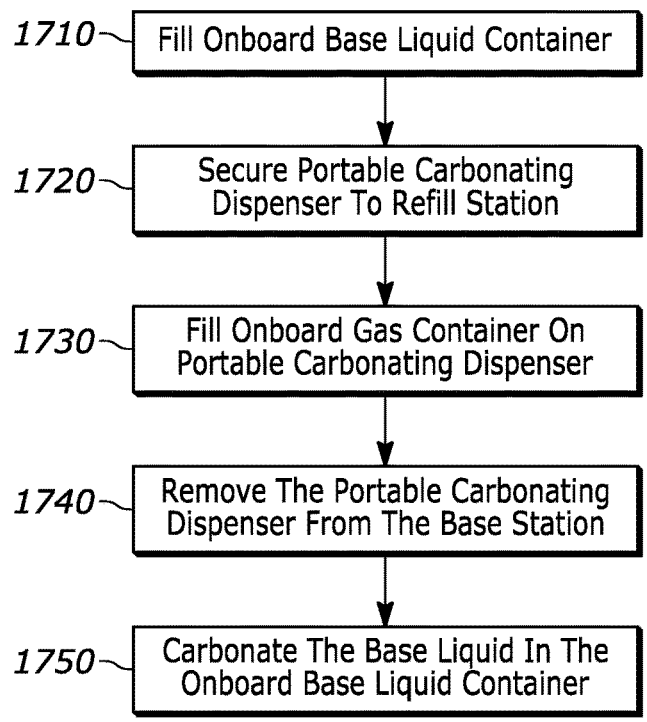
FIG. 17 is a flow chart of a method of refilling a portable carbonating dispenser.

FIG. 17 illustrates an example method of filling a portable carbonating dispenser with carbonation gas using a refill station according to aspects of the disclosure. At step 1710, the onboard base liquid container 100 (FIG. 4) may be filled with a base liquid. This may be an optional step, as refill of the onboard carbonation system may occur regardless of the status of the base liquid container (full or empty). At step 1720, the portable carbonating dispenser is secured to the refill station 500, including a locking connection to the quick connect fitting 528, for example. At step 1730, a user may actuate the refill valve actuation lever 524 to cause opening of the refill valve 526 and flow of gas from the refill gas container 510 to the onboard gas container 210. At step 1740, after gas flow is discontinued, the user may remove the portable carbonating dispenser 50 from the refill station by depressing the lock release button 510, for example. At step 1750, carbonation of the base liquid may be performed on the portable carbonating dispenser by user configuration of the dispenser to a carbonation mode as described above, and user actuation of the carbonation button 262 (FIG. 1) to achieve a desired level of carbonation.

It should be understood that implementation of other variations and modifications of the aspects and embodiments described herein are intended to be part of this disclosure and the coverage intended. The scope of the invention, in its various aspects may be readily apparent to those of ordinary skill in the art, and the invention is not limited to the specific aspects or embodiments described herein, but is intended to cover any and all modifications, variations or equivalents that may be apparent from this disclosure.

What is claimed is:

1. A portable carbonating dispenser comprising:
a base liquid container for containing a base liquid supply;
a container closure including a dispensing passage for dispensing base liquid from the base liquid container;
a carbonation gas container for containing a supply of carbonation gas;
a carbonation flow control assembly for conveying carbonation gas from the carbonation gas container to pressurize the base liquid supply, the carbonation flow control assembly including a user-actuated flow control component for controlling a flow of carbonation gas to the base liquid supply; and
an isolating component for permitting a user to selectively isolate the dispensing passage and thereby prevent pressurization of the dispensing passage when the base liquid supply is pressurized by the carbonation gas, wherein the container closure includes a cartridge receiving space, and wherein the isolating component is adapted to isolate the cartridge receiving space from the base liquid container.

2. The portable carbonating dispenser of claim 1, wherein the isolating component includes a mode selector lever on the container closure.

3. The portable carbonating dispenser of claim 1, wherein the cartridge receiving space is disposed in the dispensing passage.

4. The portable carbonating dispenser of claim 1, wherein the carbonation flow control assembly includes a gas container refilling connection for conveying a refill supply of gas to the gas container from an external refill station.

5. The portable carbonating dispenser of claim 1, further comprising a carbonation level indicator for indicating a carbonation level of the base liquid supply.

6. The portable carbonating dispenser of claim 1, further comprising a vent for venting pressure from the base liquid container.

7. The portable carbonating dispenser of claim 1, further comprising a relief valve adapted to relieve carbonation pressure in the base liquid container when the carbonation pressure is above a predetermined threshold.

8. The portable carbonating dispenser of claim 7, wherein the relief valve is set to relieve carbonation pressure above 60 psi.

9. The portable carbonating dispenser of claim 1, wherein the base liquid container includes an extended portion for containing the base liquid at a first depth, the carbonation flow control assembly including a nozzle arranged to supply carbonation gas to the base liquid in the extended portion of the base liquid container.

10. The portable carbonating dispenser of claim 1, wherein the base liquid container includes a carbonation viewing window arranged to permit viewing of the base liquid supply by a user.

11. The portable carbonating dispenser of claim 10, wherein the carbonation viewing window is arranged to permit viewing of carbonation gas bubbling from a carbonation gas nozzle during a carbonation operation.

12. The portable carbonating dispenser of claim 1, wherein the isolating component includes a closure insert disposed in a journal formed in the container closure.

13. The portable carbonating dispenser of claim 12, wherein the closure insert is adapted to be actuated with a mode selector lever on the container closure to configure the portable carbonating dispenser to a carbonation mode or a dispensing mode.

14. The portable carbonating dispenser of claim 10, wherein the carbonation viewing window is elongated in a direction in which carbonation bubbles travel when the base liquid container is upright.

15. The portable carbonating dispenser of claim 1, wherein the isolating component is arranged to be actuated by a mode selector lever which permits a user to switch the portable carbonating dispenser to a dispensing mode or a carbonation mode.

16. The portable carbonating dispenser of claim 15, wherein the mode selector lever is arranged to actuate a vent to release pressure in the base liquid container when the mode selector lever is switched to the dispensing mode.

17. The portable carbonating dispenser of claim 15, further comprising a carbonation level indicator arranged to prevent movement of the mode selector lever to the dispensing mode when the base liquid container is pressurized.

18. The portable carbonating dispenser of claim 15, further comprising an alignment projection on the container closure, the alignment projection being arranged to align with the mode selector lever when the mode selector lever is in a carbonation mode position.

19. The portable carbonating dispenser of claim 12, wherein the closure insert comprises at least one insert port and at least one blocking surface adapted to cooperate with at least one journal port to selectively isolate the dispensing passage from an interior of the base liquid container during a carbonation mode.

20. The portable carbonating dispenser of claim 1, further comprising a viewing window, wherein the viewing window is formed integrally on the base liquid container and is disposed in an aperture formed in the base liquid container.

21. The portable carbonating dispenser of claim 20, wherein the user-actuated flow control component comprises a carbonation button for actuating the carbonation flow control assembly, wherein the viewing window is aligned with the carbonation button.

22. The portable carbonating dispenser of claim 1, wherein the isolating component is actuated by a mode selector lever that permits a user to switch the portable carbonating dispenser to a dispensing mode or a carbonation mode, wherein movement of the mode selector lever is prevented when the base liquid container is pressurized.

23. The portable carbonating dispenser of claim 1, further comprising a carbonation level indicator that is adapted to be actuated by pressure in the base liquid container, wherein the isolating component is actuated by a mode selector lever that permits a user to switch the portable carbonating dispenser to a dispensing mode or a carbonation mode, and wherein the mode selector lever comprises a stop that is arranged to engage the carbonation level indicator when the base liquid container is under pressure.

24. The portable carbonating dispenser of claim 1, further comprising a carbonation level indicator adapted to move to an indicating position when the base liquid container is pressurized.

25. The portable carbonating dispenser of claim 1, wherein the base liquid container comprises a recess for accommodating at least part of the carbonation flow control assembly.

26. The portable carbonating dispenser of claim 1, wherein the carbonation flow control assembly includes a refill connection.

27. A portable carbonating dispenser comprising:
a base liquid container for containing a base liquid supply;
a container closure comprising a dispensing passage for dispensing base liquid from the base liquid container, the container closure further comprising a cartridge receiving space adapted to receive an additive cartridge;
a carbonation gas container for containing a supply of carbonation gas;
a carbonation flow control assembly for conveying carbonation gas from the carbonation gas container to pressurize the base liquid supply, the carbonation flow control assembly including a user-actuated flow control component for controlling a flow of carbonation gas to the base liquid supply; and
an isolating component for permitting a user to selectively isolate the dispensing passage and thereby prevent pressurization of the dispensing passage when the base liquid supply is pressurized by the carbonation gas.

28. A portable carbonating dispenser comprising:
a base liquid container for containing a base liquid supply;
a container closure comprising a dispensing passage for dispensing base liquid from the base liquid container, the container closure further comprising a cartridge receiving space adapted to receive an additive cartridge;
a carbonation gas container for containing a supply of carbonation gas; and
a carbonation flow control assembly for conveying carbonation gas from the carbonation gas container to pressurize the base liquid supply, the carbonation flow control assembly including a user-actuated flow control component for controlling a flow of carbonation gas to the base liquid supply.

* * * * *